United States Patent [19]
Terada et al.

[11] Patent Number: 5,794,042
[45] Date of Patent: Aug. 11, 1998

[54] FILE MANAGEMENT APPARATUS PERMITTING ACCESS TO PORTIONS OF A FILE BY SPECIFYING A DATA STRUCTURE IDENTIFIER AND DATA ELEMENTS

[76] Inventors: Hiroaki Terada, No. B-803 Senri Ichijoike, 52 Yamadanishi 3-chome; Hiroaki Nishikawa, No. A-306 Mezon Senriyama, 17 Senriyamahigashi 2, chome, both of Suita-shi, Osaka-fu; Shin-ichi Yoshida, 5-14 Kitayagi-cho 1-chome, Kashihara-shi, Nara-ken; Shunji Hine, No. 637 Merodihaimu Moriguchi, 26-2 Keihanhondori 1-chome, Moriguchi-shi, Osaka-fu; Youichiro Nishikawa, No. 106, 9-5 Nishikonyou 1-chome, Amagasaki-shi, Hyogo-ken; Shuji Hara, No. 1001, 10-37 Daitou-cho 1-chome, Miyakojima-ku, Osaka-shi, Osaka-fu; Kenji Shima, 4-14 Koushien 2-bancho, Nishinomiya-shi, Hyogo-ken; Yoshie Inaoka, No. 201, 5-20 Itami 1-chome, Itami-shi, Hyogo-ken; Tetsuo Yamasaki, c/o Taiheiryo, 1 Andouji-cho 2-chome, Imami-shi, Hyogo-ken, all of Japan

[21] Appl. No.: 764,773

[22] Filed: Dec. 12, 1996

Related U.S. Application Data

[63] Continuation of Ser. No. 320,974, Oct. 7, 1994, abandoned, which is a continuation of Ser. No. 729,730, Jul. 15, 1991, abandoned.

[30] Foreign Application Priority Data

Jul. 17, 1990 [JP] Japan .................................. 2-191819

[51] Int. Cl.⁶ .................................................. G06F 9/45
[52] U.S. Cl. .......................... 395/701; 707/102; 707/203; 345/333
[58] Field of Search ..................... 395/619, 772, 395/701, 712, 611, 612, 613, 614, 335, 352–353; 707/1, 102, 103, 203; 345/331–333

[56] References Cited

U.S. PATENT DOCUMENTS

| | | | |
|---|---|---|---|
| 4,315,315 | 2/1982 | Kossiakoff | 395/140 |
| 4,455,619 | 6/1984 | Masui et al. | 395/160 |
| 4,481,607 | 11/1984 | Kobayashi et al. | 364/419.02 |
| 4,558,413 | 12/1985 | Schmidt et al. | 395/600 |
| 4,571,700 | 2/1986 | Emry, Jr. et al. | 364/419.19 |
| 4,656,603 | 4/1987 | Dunn | 395/1 |
| 4,731,734 | 3/1988 | Gruner et al. | 395/375 |

(List continued on next page.)

FOREIGN PATENT DOCUMENTS

| | | |
|---|---|---|
| 59-125461 | 7/1984 | Japan. |
| 60-027040 | 2/1985 | Japan. |

OTHER PUBLICATIONS

"The C Programming Language" Second Edition, Prentice Hall Software Series, Kernighan & Richie, Chapter 5: Pointers and Arrays, pp. 93–95, Jun. 1978.

(List continued on next page.)

Primary Examiner—Thomas G. Black
Assistant Examiner—Hosain T. Alam
Attorney, Agent, or Firm—McDermott, Will & Emery

[57] ABSTRACT

A file management apparatus includes a file storage portion and a manipulation portion. The file storage portion stores a plurality of files therein. Each file includes one or more data structures. Each data structure includes one or more elements. The file storage portion further identifies each file with a file identifier and identifies each data structure within the file with an internal identifier and with the number of data structures contained in the file. The position of each data element and the number of data elements within a data structure are also identified. The manipulation portion manipulates the structure of the data stored in the file storage portion by employing the file identifier, the data structure identifier, and element position.

4 Claims, 38 Drawing Sheets

U.S. PATENT DOCUMENTS

| | | | |
|---|---|---|---|
| 4,803,643 | 2/1989 | Hickey | 395/147 |
| 4,831,580 | 5/1989 | Yamada | 395/133 |
| 4,864,497 | 9/1989 | Lowry et al. | 395/611 |
| 4,912,637 | 3/1990 | Sheedy | 395/619 |
| 4,939,689 | 7/1990 | Davis et al. | 395/600 |
| 4,956,773 | 9/1990 | Saito et al. | 395/159 |
| 4,961,148 | 10/1990 | Holda et al. | 364/468 |
| 4,970,678 | 11/1990 | Sladowski et al. | 395/275 |
| 5,129,086 | 7/1992 | Coyle, Jr. et al. | 395/650 |
| 5,146,552 | 9/1992 | Cassorla et al. | 395/145 |
| 5,199,104 | 3/1993 | Hirayama | 395/145 |
| 5,276,870 | 1/1994 | Shau et al. | 395/600 |
| 5,303,361 | 4/1994 | Colwell et al. | 395/425 |
| 5,524,253 | 6/1996 | Pham et al. | 395/800 |

OTHER PUBLICATIONS

"File Management in C and Assembly Languages", Ray Duncun, PC Magazine, v8, n4, p297(3), Sections C File Functions—stream functions, Feb. 1989.

"Sequential File Processing," Part I, Ray Duncun, PC Magazine, v8, n5, p341(5), Section Text-File Processing in C—stream functions, Mar. 1989.

"The Big Picture (Access, Info on Remote Data Management System)" by Mitch Bishop et al., Unix Review, v7, n8, p38(7): Aug., 89.

"Super–Charged Application Development", Betty Y. Forman Digital Review, v6, n16, p35(3); Apr., 1989.

"Data Dictionaries: the CASE Connection", Matthew Rapaport, Computer Language, v6, n3, p9(6); Mar., 1989.

C.J. Date, *An Introduction to Database Systems*, 1986, pp. 108–113, 119–121, 127–132, 136–137, 147–151, 165–169, 233–234, 254–255, 431–432.

Hiroshi Kanekura et al., "An Implementation of Intelligent Interfacing Function in the Ultra–High Level Diagrammatical–Specification Processing System", A collection of speeches at the 34th national conference of Information Processing Society of Japan, Information Processing Society of Japan, 1987, vol. 34, No. 2, pp. 839–844.

Hiroaki Nishikawa et al., "A Design Concept for the Ultra High–Level Diagrammatical–Language Processing System," A collection of speeches at the 33rd national conference of Information Processing Society of Japan, Information Processing Society of Japan, 1986, vol. 33, No. 2, pp. 647–656.

Hiroaki Nishikawa et al., "Design Philosophy of Advanced Environment for Software Production (AESOP)," A research report by Information Processing Society of Japan, Information Processing Society of Japan, Jul. 18, 1990, vol. 90, No. 60 (90–ARC–83), pp. 7–18.

Hiroaki Nishikawa et al., "Coordinated Diagrammatical Specifications in the Aesop Environment," A collection of speeches at the 41st national conference of Information Processing Society of Japan, Information Processing Society of Japan, 1990, vol. 41, No. 5, pp. 265–274.

"§ 16: Instruction for updating", Database of Codasyl, bit (extra issue), Kyoritsu Shuppan, Aug. 5, 1979, pp. 103–117.

New Database Technology, bit (extra issue), Kyoritsu Shuppan, Apr. 7, 1980, pp. 1–49.

Microsoft Company, Ltd., Microsoft C Optimizing Compiler Run–time Library Reference 1, pp. 59–71 date unknown.

FIG. 3
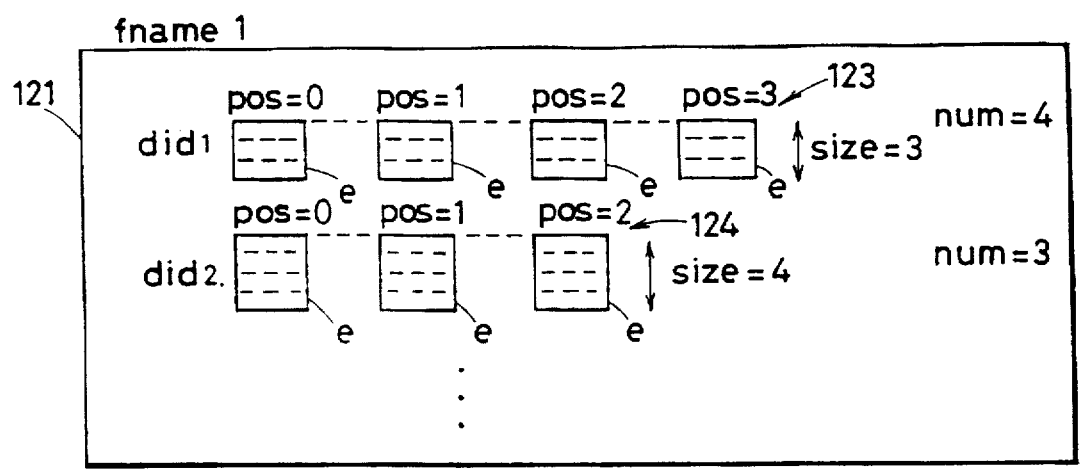
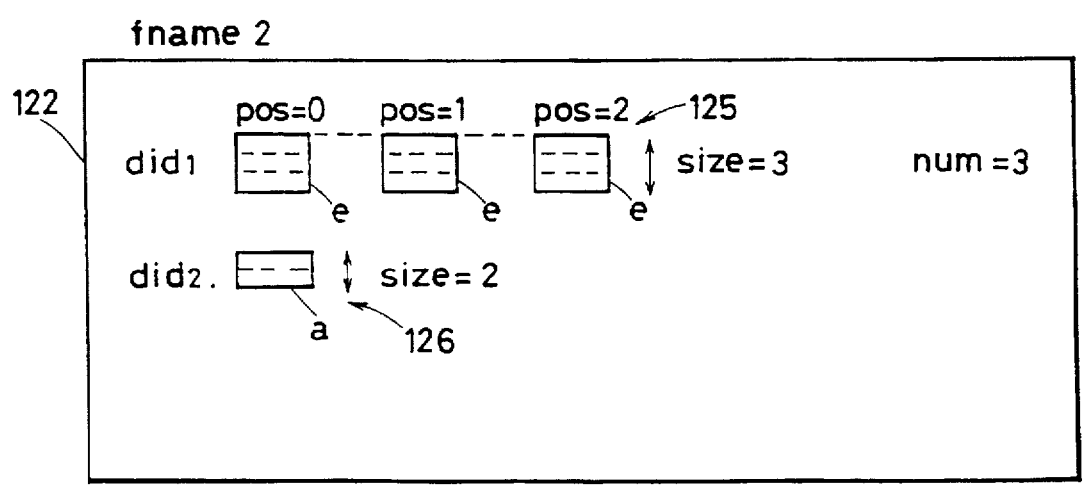

FIG. 4

| FILE NAME f name | DATA STRUCTURE IDENTIFIER did | ELEMENT NUMBER num | ELEMENT SIZE size | PRESENT DATA POSITION p pos | ELEMENT CONTENTS data | ELEMENT CONTENTS data |
|---|---|---|---|---|---|---|
| | | | | | | |
| | | | | | | |
| | | | | | | |
| --- | --- | --- | --- | --- | --- | --- |

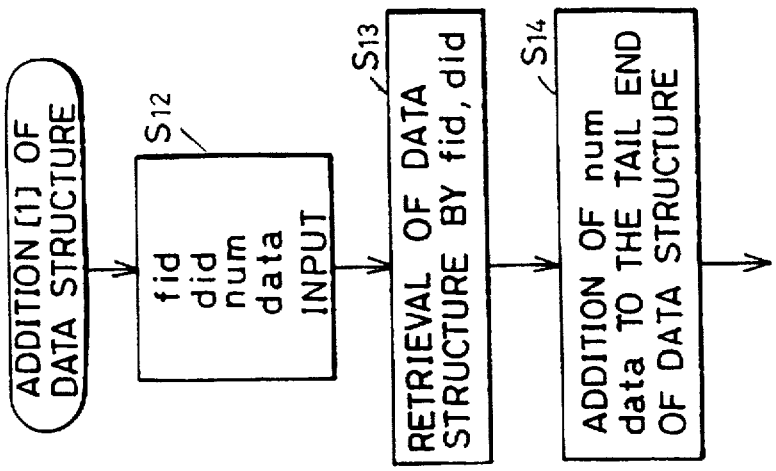
FIG.9A
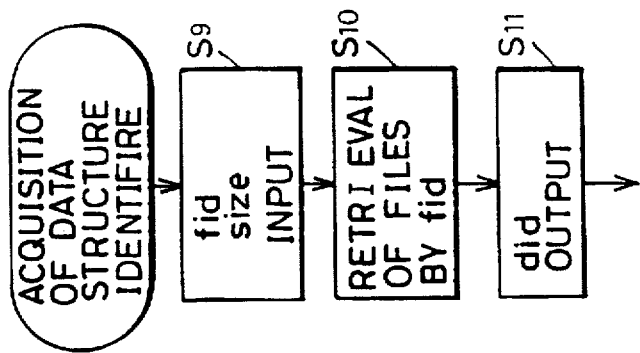
FIG.8
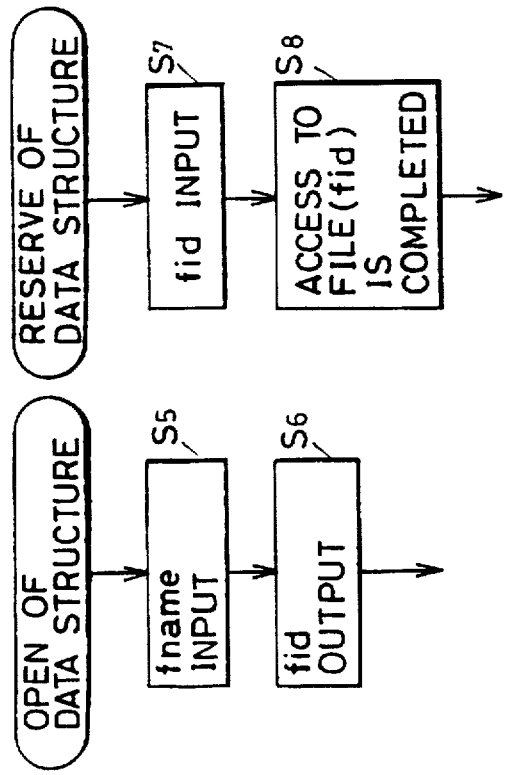
FIG.7
FIG.6

FIG.13A

WRITING OF DATA STRUCTURE → [S27: fid / did / num / pos / data INPUT] → [S28: RETRIEVAL OF DATA STRUCTURE BY fid,did] → [S29: RETRIEVAL OF DATA POSITION BY pos] → [S30: REWRITING OF num ELEMENTS TO data] →

FIG.12A

READING OF DATA STRUCTURE → [S23: fid / did / num / pos INPUT] → [S24: RETRIEVAL OF DATA STRUCTURE BY fid,did] → [S25: RETRIEVAL OF DATA POSITION BY pos] → [S26: READING OF num ELEMENTS] →

FIG.11A

DELETION OF DATA STRUCTURE → [S19: fid / did / num / pos INPUT] → [S20: RETRIEVAL OF DATA STRUCTURE BY fid,did] → [S21: RETRIEVAL OF DATA POSITION BY pos] → [S22: DELETION OF num ELEMENTS] →

FIG.10A

INSERTION[1] OF DATA STRUCTURE → [S15: fid / did / num / pos / data INPUT] → [S16: RETRIEVAL OF DATA STRUCTURE BY fid,did] → [S17: RETRIEVAL OF DATA POSITION BY pos] → [S18: INSERTION OF num data] →

(AFTER EXECUTION OF DATA DELETION)

(AFTER EXECUTION OF DATA READING)

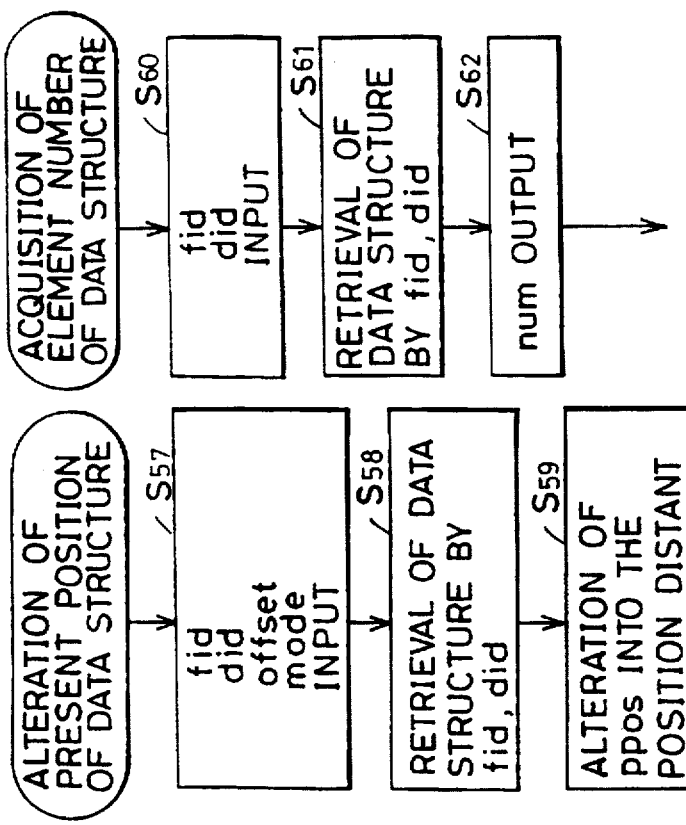

FIG. 21 — ACQUISITION OF ELEMENT NUMBER OF DATA STRUCTURE → fid, did INPUT (S60) → RETRIEVAL OF DATA STRUCTURE BY fid, did (S61) → num OUTPUT (S62)

FIG. 20 — ALTERATION OF PRESENT POSITION OF DATA STRUCTURE → fid, did, offset, mode INPUT (S57) → RETRIEVAL OF DATA STRUCTURE BY fid, did (S58) → ALTERATION OF ppos INTO THE POSITION DISTANT BY offset FROM REFERENCE POSITION INDICATED BY mode (S59)

FIG. 19 — INFORMING OF PRESENT POSITION OF DATA STRUCTURE → fid, did INPUT (S54) → RETRIEVAL OF DATA STRUCTURE BY fid, did (S55) → ppos OUTPUT (S56)

FIG. 18 — ERASURE OF DATA STRUCTURE → fid, did INPUT (S51) → RETRIEVAL OF DATA STRUCTURE BY fid, did (S52) → ERASURE OF DATA STRUCTURE (S53)

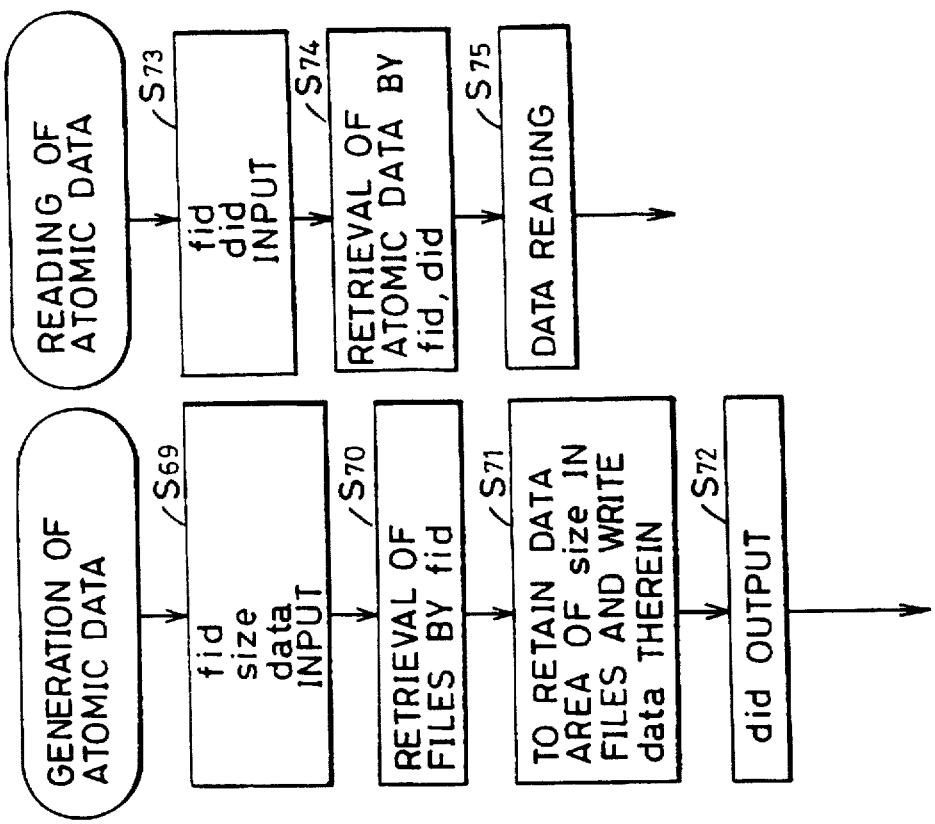
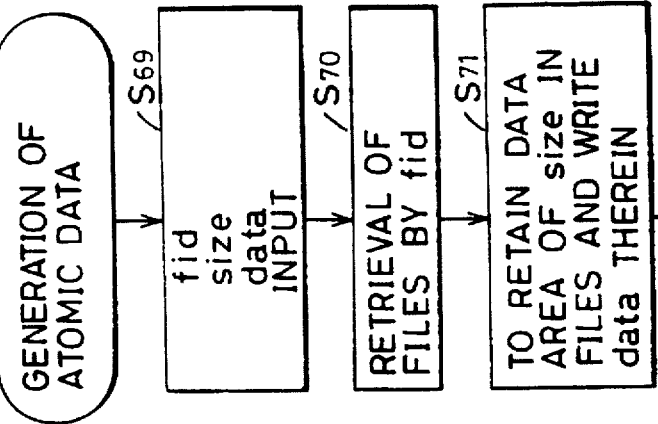
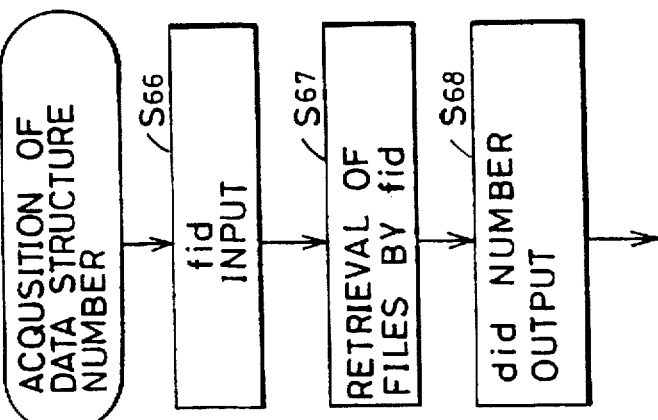
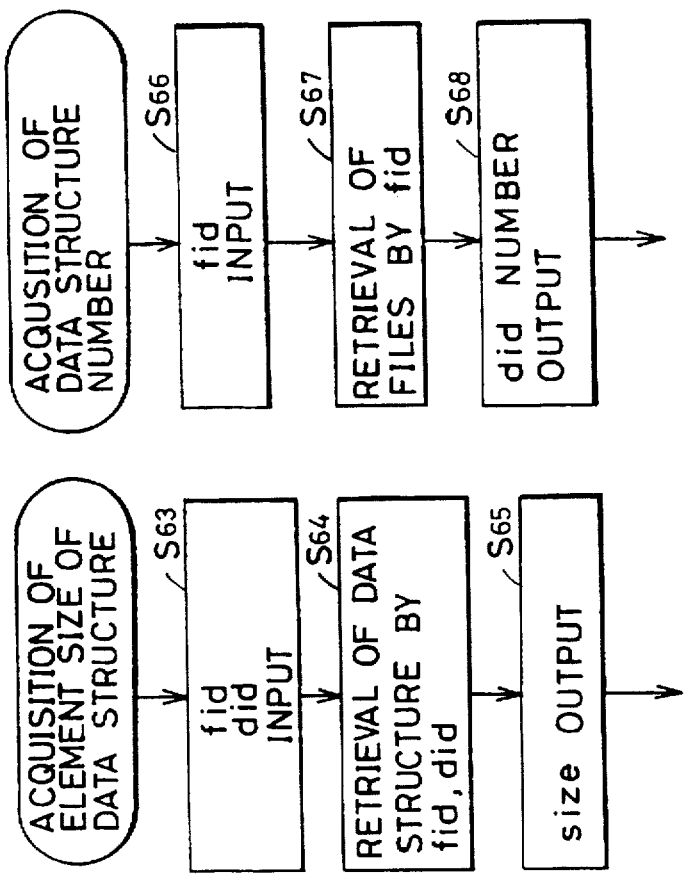

IO: INPUT/OUTPUT UNIT
CV: MUTUAL CONVERSION UNIT
EX: EXECUTION UNIT
CP: PARTS MANAGEMENT UNIT
UF: UNIFIED FILE MANAGEMENT UNIT
En: EDITOR
Dp: DISPLAY UNIT

| STOCK BOOK | | |
|---|---|---|
| ARTICLE NAME | QUANTITY | CONTAINER NUMBER |
| string | int | int |
| | | |

| LACKING ARTICLE CONFIRMATION | | |
|---|---|---|
| STOCK LIST·QUANTITY == 0 | Y | N |
| REGISTERING PROCESS | X | – |

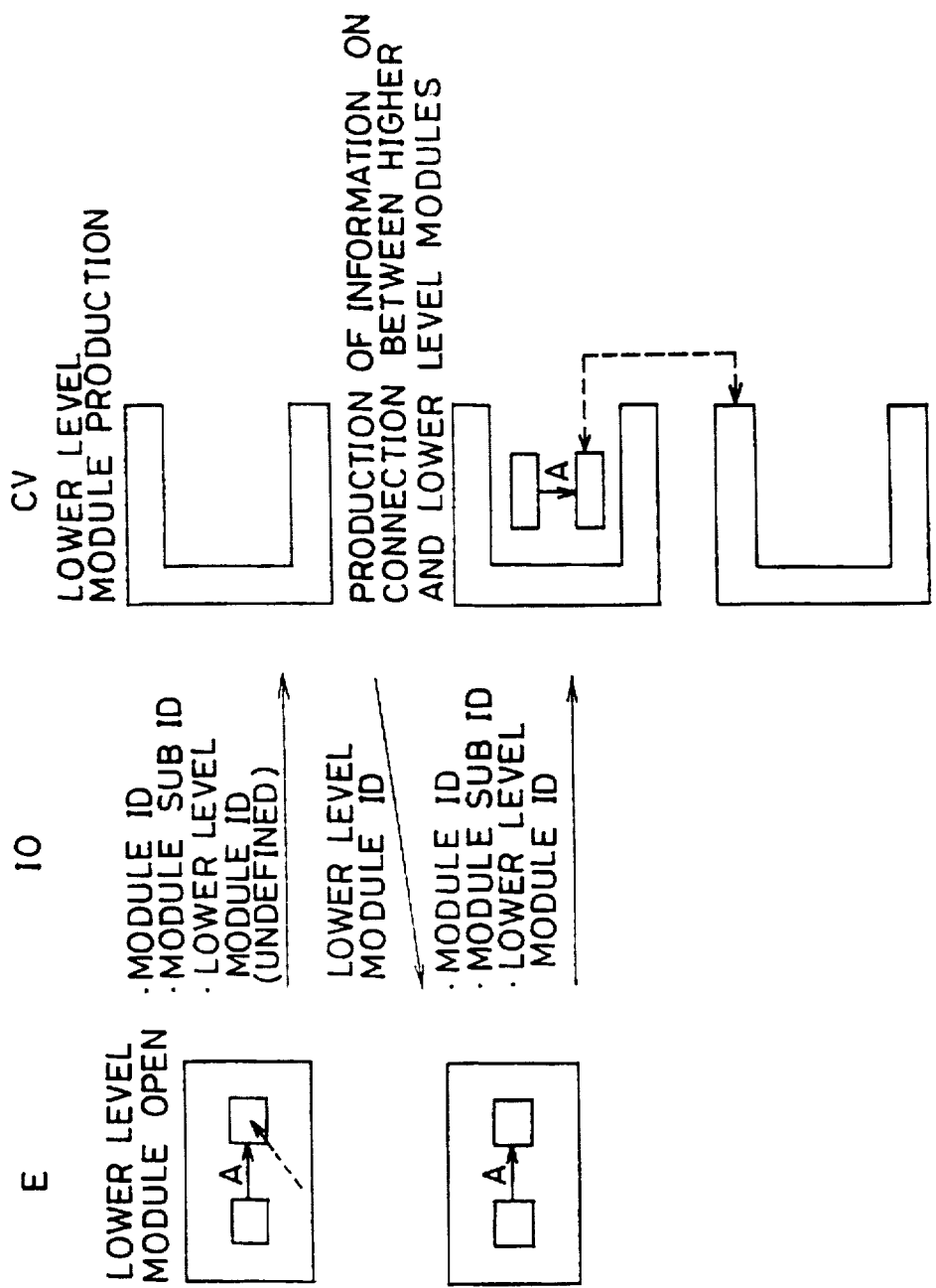

FILE MANAGEMENT APPARATUS PERMITTING ACCESS TO PORTIONS OF A FILE BY SPECIFYING A DATA STRUCTURE IDENTIFIER AND DATA ELEMENTS

This application is a continuation of application Ser. No. 08/320,974 filed Oct. 7, 1994 now abandoned which is a continuation of application Ser. No. 07/729,730 filed Jul. 15, 1991 now abandoned.

BACKGROUND OF THE INVENTION

1. Field of the Invention

The present invention relates generally to file management apparatus, and more particularly to a file management apparatus for storing files and making access to the stored files in response to an externally applied instruction, and an operating method thereof.

2. Description of the Background Art

In general, a file management apparatus is comprised of a disk storing a plurality of files therein and a disk driving apparatus for making access to the disk. In a conventional file management apparatus, a file reading and writing is executed in units of record in response to application of a read instruction and a write instruction from an information processing unit utilizing the file management apparatus.

In a system employing such a conventional file management apparatus, when data having a list structure is handled, for example, it is necessary to prepare a program for manipulation of a data structure such as addition, insertion and deletion of the list structure on the side of the information processing unit utilizing such a file management apparatus. In this case, data is read from the file management apparatus, the data structure manipulation is made for the read data, and the data is stored again in the disk of the file management apparatus. Further, when a plurality of information processing units share a single file management apparatus, each information processing unit requires a program for data structure manipulation. Thus, there is a disadvantage that efficiency in development of software decreases.

In addition, for development of a plurality of processing systems by utilizing a single file management apparatus, a function of data structure manipulation is required for the respective processing systems. In this case, when one processing system first manipulates the data structure of data in the file management apparatus and, then other processing systems manipulate the manipulated data structure of the data, the data structure manipulation in the other processing systems must be waited until the data structure manipulation in the one processing system is terminated. Thus, the program of the data structure manipulation in the one processing system and those in the other processing systems are dependent on one another. Accordingly, it entails difficulties to independently develop the plurality of processing systems.

SUMMARY OF THE INVENTION

One object of the present invention is to increase efficiency in software development.

Another object of the present invention is to provide a file management apparatus having a function of manipulating the structure of data, and an operating method thereof.

A further object of the present invention is to provide a file management apparatus for enabling parallel development of a plurality of processing systems.

A file management apparatus according to the present invention includes a storage portion for storing a plurality of data along with identifiers, and a manipulation portion responsive to an applied instruction for manipulating the structure of the data stored in the storage portion by using the identifiers.

The storage portion stores therein a plurality of data as one or a plurality of files including one or a plurality of data. The plurality of data each include one or a plurality of elements.

The identifiers include a file identifier for specifying each of the files and a data identifier for specifying each data. The identifiers may further include a position identifier for specifying the position of elements included in each data, an element number identifier for specifying the number of elements, and an element size identifier for specifying the size of each element.

A file management apparatus according to the present invention has a function of manipulating the structure of data by using the identifiers stored together with the data. Accordingly, data structure manipulation is carried out within the file management apparatus only by application of a predetermined instruction from an apparatus or processing system utilizing such a file management apparatus.

Consequently, it is unnecessary to prepare a program for data structure manipulation on the side of the apparatus or processing system utilizing the file management apparatus, and it also becomes unnecessary to be associated with an implementation method of data structure manipulation. Thus, efficiency in software development improves.

In addition, parallel development of a plurality of processing systems utilizing a file management apparatus is enabled, and independence of each processing system can be enhanced. It thus becomes possible to organize such a system that can flexibly cope with an enhancement in the function of each processing system.

A program developing apparatus according to another aspect of the present invention includes: a specification describing portion for preparing a graphic description of specifications with respect to an object program on a display screen; a converting portion for converting the specification description prepared by the specification describing portion into an executable program; and a file managing portion for storing therein as files, a plurality of data representing the specification description prepared by the specification describing portion and a plurality of data indicating the executable program converted by the converting portion. The file managing portion includes a storage portion for storing therein the plurality of data together with identifiers, and a manipulation portion responsive to an applied instruction for manipulating the structure of the data stored in the storage portion by using the identifiers.

The program development apparatus may include a parts managing portion including means for registering the specification description prepared by the specification describing portion as parts information, and means for presenting the registered parts information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram conceptionally showing the configuration of files stored in a file storage portion;

FIG. 4 is a diagram for use in explaining stored contents of the file storage portion;

FIG. 6 is a flow chart for use in explaining an open function of data structure;

FIG. 7 is a flow chart for use in explaining a reserving function of data structure;

FIG. 8 is a flow chart for use in explaining an acquisition function of a data structure. identifier;

FIG. 9A is a flow chart for use in explaining an addition [1] function of data structure;

FIG. 10A is a flow chart for use in explaining an insertion [1] function of data structure;

FIG. 11A is a flow chart for use in explaining a deletion function of data structure;

FIG. 12A is a flow chart for use in explaining a read function of data structure;

FIG. 13A is a flow chart for use in explaining a write function of data structure;

FIG. 18 is a flow chart for use in explaining an erasure function of data structure;

FIG. 19 is a flow chart for use in explaining a present position informing function of data structure;

FIG. 20 is a flow chart for use in explaining a present position altering function of data structure;

FIG. 21 is a flow chart for use in explaining an element number acquiring function of data structure;

FIG. 22 is a flow chart for use in explaining an element size acquiring function of data structure;

FIG. 23 is a flow chart for use in explaining a function of acquiring the number of data structures;

FIG. 24 is a flow chart for use in explaining a function of generating atomic data;

FIG. 25 is a flow chart for use in explaining a function of reading atomic data;

FIGS. 44A and 44B are diagrams illustrating a data transmission sequence between a graphic editor being specification description representation means and the mutual conversion unit;

DESCRIPTION OF THE PREFERRED EMBODIMENTS

Figure 1:
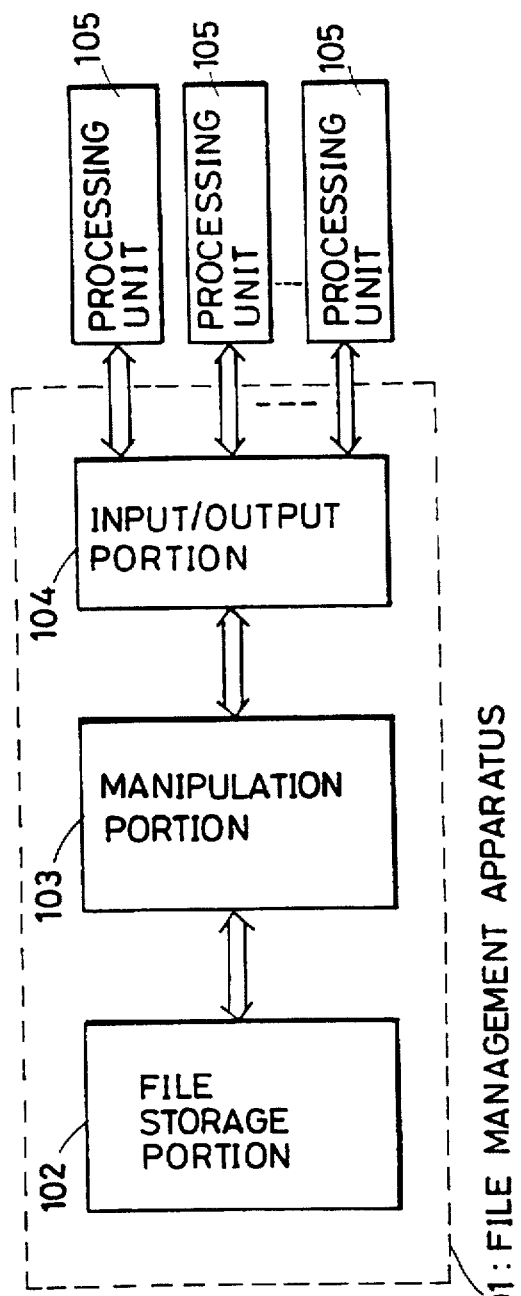
FIG. 1 is a block diagram showing the configuration of a file management apparatus according to one embodiment of the present invention.

A file management apparatus 101 shown in FIG. 1 includes a file storage portion 102, a manipulation portion 103 and an input/output portion 104. Input/output portion 104 is connected with one or a plurality of information processing units 105. A plurality of files including a plurality of data are stored in file storage portion 102. Manipulation portion 103 has a function of making access to each of the files in file storage portion 102 in response to an instruction applied through input/output portion 104 and also has a function of manipulating a data structure of the data included in each file. Input/output portion 104 provides various instructions and data applied from information processing units 105 to manipulation portion 103 and also provides data applied as an output from manipulation portion 103 to information processing units 105.

Figure 2:
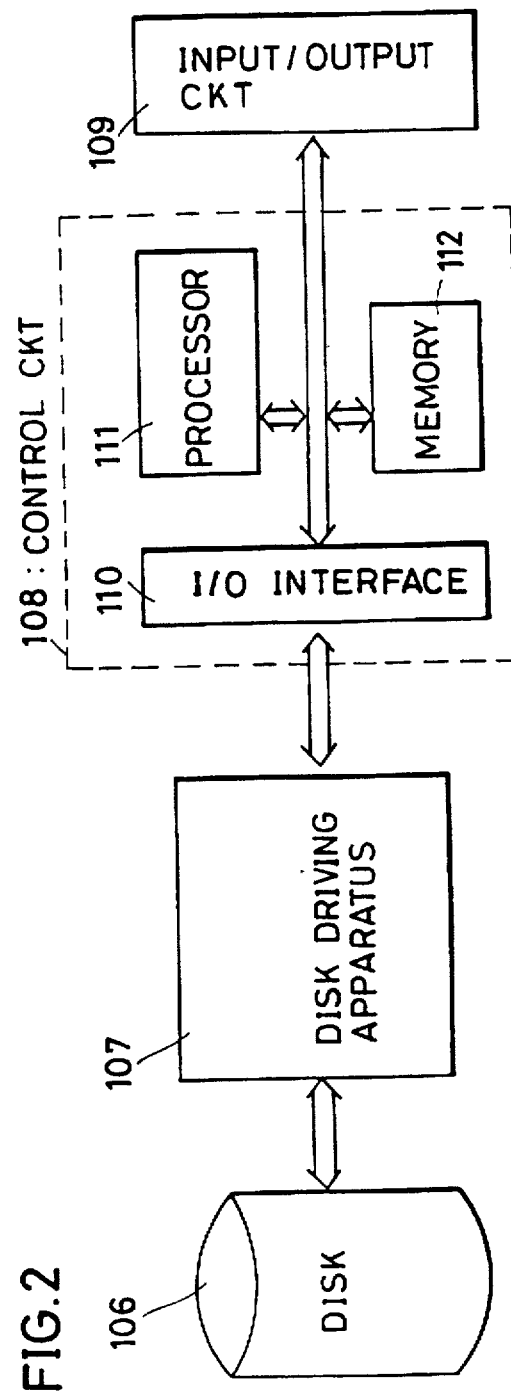
FIG. 2 is a block diagram showing a hardware configuration of the above embodiment.

FIG. 2 is a block diagram showing a hardware configuration of file management apparatus 101 shown in FIG. 1. A plurality of files are stored in a disk 106. A disk driving apparatus 107 drives disk 106 and responds to a control signal applied from a control circuit 108 to make access to each of the files in disk 106. Control circuit 108 is mainly comprised of an I/O interface 110, a processor 111 and a memory 112. Memory 112 stores therein a program for executing a plurality of functions shown in the following. Processor 111 executes the program stored in memory 112 and applies a control signal via I/O interface 110 to disk driving apparatus 107. An input/output circuit 109 serves as an interface between control circuit 108 and an external information processing unit. Disk 106 constitutes file storage portion 102, and programs stored in disk driving apparatus 107, control circuit 108 and memory 112 in control circuit 108 constitute manipulation portion 103. Input/output circuit 109 constitutes input/output portion 104.

FIG. 3 is a diagram conceptionally showing the configuration of files stored in file storage portion 102.

Only two files 121 and 122 are shown in FIG. 3. Each file is designated by its corresponding file name. For example, file 121 is designated by a file name fname 1, and file 122 is designated by a file name fname 2. Each file includes a data structure formed of a plurality of elements "e" or atomic data formed of a single element "a".

Each data structure or atomic data in each file is provided with a data structure identifier. For example, a data structure 123 in file 121 is provided with a data structure identifier did1, and a data structure 124 therein is provided with a data structure identifier did2. Similarly, a data structure 125 in file 122 is provided with a data structure identifier "did1", and atomic data 126 therein is provided with a data structure identifier "did2".

A reference character "pos" denotes the position of each element in each data structure, i.e., a data position. A reference character "size" denotes the size of each element "e" in each data structure. For example, the element size "size" of data structure 123 is 3, and that of data structure 124 is 4. A reference character "num" denotes the number of elements included in each data structure. For example, the element number "num" of data structure 123 is 4, and that of data structure 124 is 3.

FIG. 4 is a diagram showing stored contents of a file storage portion 102.

With reference to FIG. 4, file storage portion 102 stores therein for each data structure, a file name "fname", a data structure identifier "did", an element number "num", an element size "size", a present data position "ppos", and contents "data" of each element. When a file is opened, the present "data" position ppos is set to 0, and varies depending on a subsequent data structure manipulation.

FIGS. 5–27 are flow charts for use in explaining functions of manipulation portion 103. The functions of manipulation portion 103 are accomplished by a program stored in memory 112 in control circuit 108.

Figure 5:
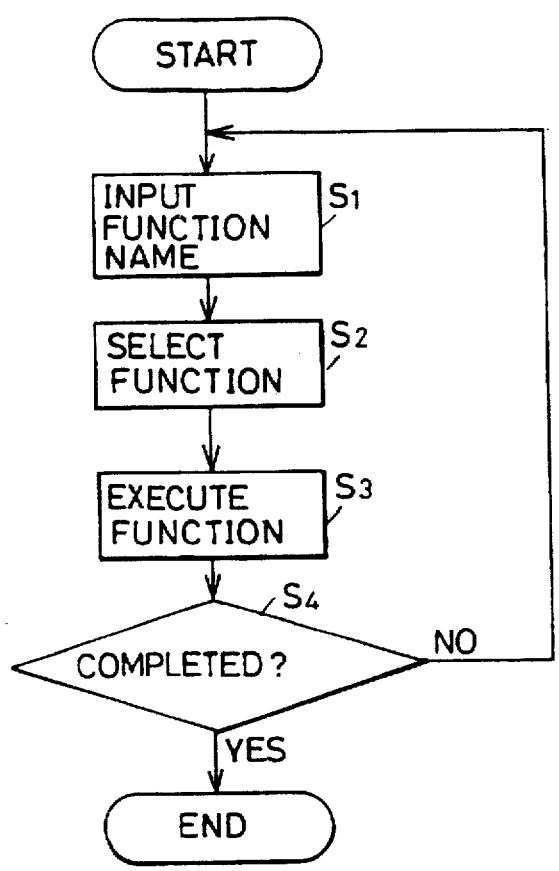
FIG. 5 is a flow chart for use in explaining an operation of a manipulation portion.

First, a function name is input to manipulation portion 103 via input/output portion 104 from external information processing units 105 (step S1 of FIG. 5). Manipulation portion 103 selects any one of the following functions (1) to (22) on the basis of the input function name and executes the selected function (steps S2 and S3). Manipulation portion 103 returns to step S1 when continuing the processing of data structure manipulation (step S4).

Description will now be made on the processings of the data structure manipulation carried out by manipulation portion 103 with reference to FIGS. 6–27.

(1) Opening of the data structure (see FIG. 6)

The file name fname of an objective file to be accessed is input via input/output portion 104 to manipulation portion 103 (step S5). This file name fname is represented by a character string. Manipulation portion 103 outputs a logical file identifier "fid" for making access to a file identified by the file name fname (step S6). This file identifier fid consists of integers.

For example, referring to FIG. 3, when file 121 identified by a file name "fname1" is first open and file 122 identified by a file name "fname2" is then open, file 121 is provided with a file identifier "fid1" and file 122 is provided with a file identifier "fid2". If file 122 is first open, then file 122 is provided with file identifier fid1.

(2) Reserving of the data structure (see FIG. 7)

This function is employed to reserve a file to be accessed. A file identifier "fid" of the file to be reserved is input (step S7). Manipulation portion 103 terminates the access to a file identified by the file identifier fid (step S8). Thus, the accessed file is reserved.

(3) Acquisition of a data structure identifier (see FIG. 8)

This function is employed when a new data structure is produced in a certain file. A file identifier "fid" and an element size "size" are input (step S9). Manipulation portion 103 retrieves a file identified by the file identifier fid (step S10). Then, manipulation portion 103 outputs, in the retrieved file, a data structure identifier "did" for identifying an array in which a data area of the element size "size" is set as a single element (step S11).

(4) Addition [1] of the data structure (see FIG. 9A)

This function is employed when a new element is added to the tail of a certain data structure. A file identifier "fid", a data structure identifier "did", an element number "num" to be added and element contents "data" to be added are input (step S12). Manipulation portion 103 retrieves, in a file identified by the file identifier fid, a data structure identified by the data structure identifier did (step S13). Then, manipulation portion 103 adds "num" elements of the contents indicated by the element contents "data" to the tail end of the retrieved data structure (step S14).

Figure 9B:
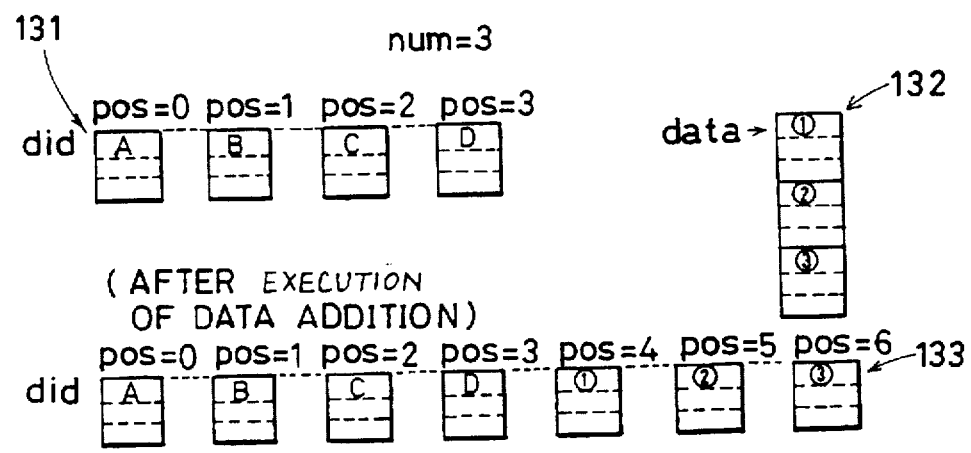
FIG. 9B is a diagram for use in explaining an example of executing the function of FIG. 9A.

For example, as shown in FIG. 9B, three elements 132 are added to the tail end of a data structure 131 identified by the data structure identifier did. Accordingly, data structure 131 is altered into a data structure 133.

(5) Insertion [1] of the data structure (see FIG. 10A)

This function is employed when a new element is inserted in a desired position in the data structure. A file identifier "fid", a data structure identifier "did", an element number "num" to be inserted, a data position "pos" to be inserted and element contents "data" to be inserted are input (step S15). Manipulation portion 103 retrieves a data structure identified by the file identifier fid and the data structure identifier did (step 16), and then retrieves a data position designated by the data position pos in the retrieved data structure (step S17). num elements of the contents indicated by the element contents "data" are inserted in the retrieved data position (step S18).

Figure 10B:
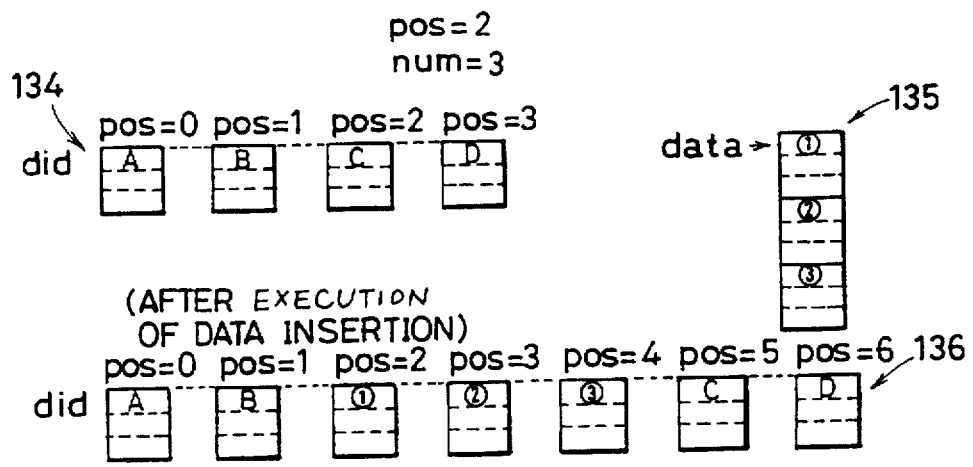
FIG. 10B is a diagram for use in explaining an example of executing the function of FIG. 10A.

For example, as shown in FIG. 10B, when three elements 135 are inserted in a data position pos=2 of a data structure 134, data structure 134 is altered into a data structure 136.

(6) Deletion of the data structure (see FIG. 11A)

A file identifier "fid", a data structure identifier "did", an element number "num" to be deleted and a data position "pos" to be deleted are input (step S19). Manipulation portion 103 retrieves a data position designated by the data position pos in a data structure identified by the file identifier fid and the data structure identifier did (steps S20 and S21). num elements are deleted from the retrieved data position (step s22).

Figure 11B:
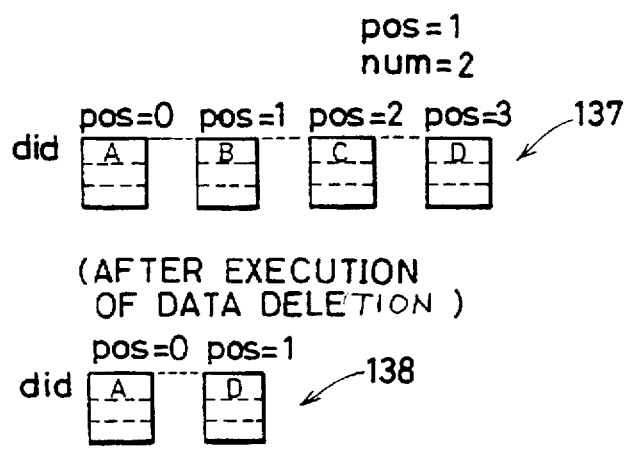
FIG. 11B is a diagram for use in explaining an example of executing the function of FIG. 11A.

For example, as shown in FIG. 11B, when a relation pos=1, num=2 is satisfied, a data structure 137 comprised of four elements is altered into a data structure 138 comprised of two elements after the deletion of the data structure.

(7) Reading of the data structure (see FIG. 12A)

A file identifier "fid", a data structure identifier "did", an element number "num" to be read and a data position "pos" to be read are input (step S23). Manipulation portion 103 retrieves a data position designated by the data position pos in a data structure identified by the file identifier fid and the data structure identifier did (steps S24 and S25). Manipulation portion 103 then reads num elements from the retrieved data position (step S26).

Figure 12B:
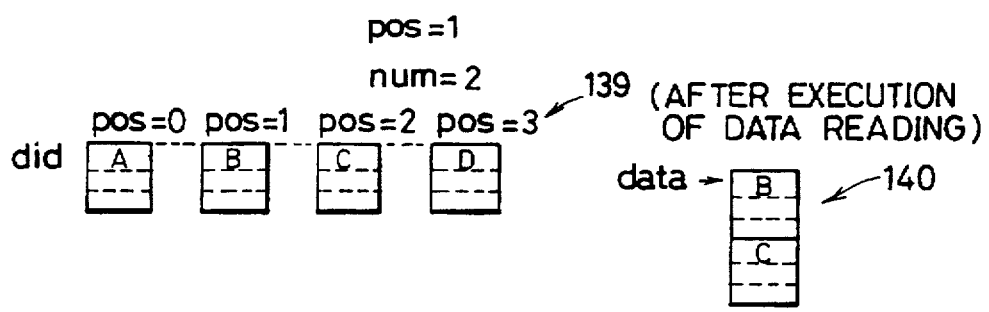
FIG. 12B is a diagram for use in explaining an example of executing the function of FIG. 12A.

For example, as shown in FIG. 12B, when the relation pos=1, num=2 is satisfied, data 140 is read from a data structure 139.

(8) Writing of the data structure (see FIG. 13A)

A file identifier "fid", a data structure identifier "did", an element number "num" to be written, a data position "pos" to be written and element contents "data" to be written are input (step S27). Manipulation portion 103 retrieves a data position designated by the data position pos in a data structure identified by the file identifier fid and the data structure identifier did (steps S28 and S29). Manipulation portion 103 then writes num elements of contents indicated by the element contents "data" from the retrieved data position (step S30). Accordingly, the contents of those elements are updated.

Figure 13B:
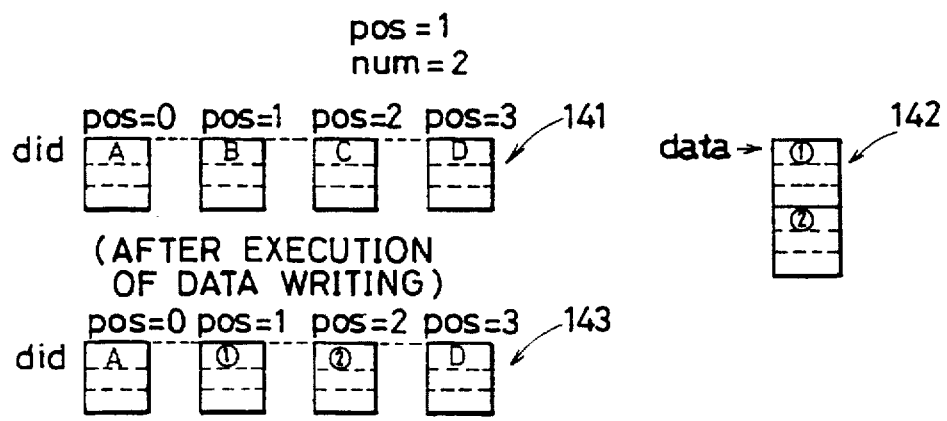
FIG. 13B is a diagram for use in explaining an example of executing the function of FIG. 13A.

For example, as shown in FIG. 13B, when the relation pos=1, num=2 is satisfied, elements in respective data positions pos=1 and pos=2 in a data structure 141 are updated by an element denoted with a reference numeral 142, so that data structure 141 is altered into a data structure 143.

Figure 14B:
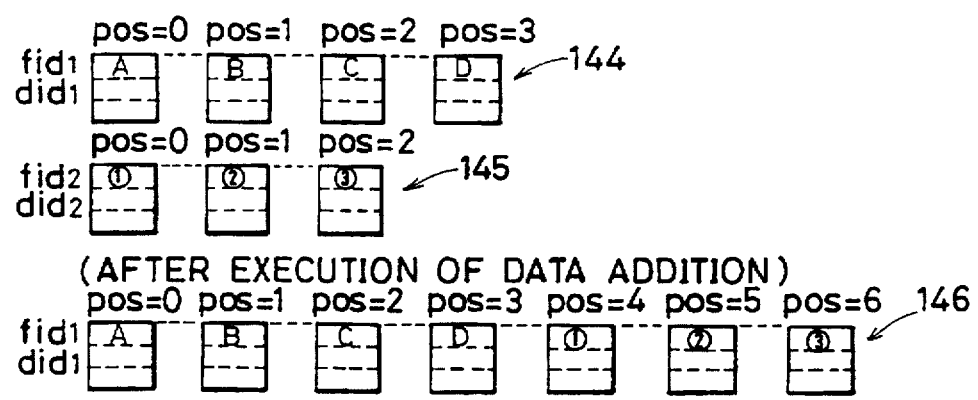
FIG. 14B is a diagram for use in explaining an example of executing the function of FIG. 14A.
Figure 14A:
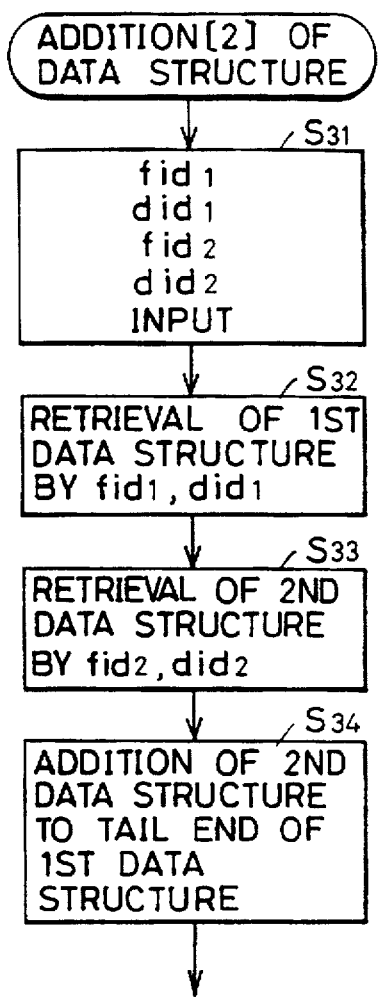
FIG. 14A is a flow chart for use in explaining an addition [2] function of data structure.

(9) Addition [2] of the data structure (see FIG. 14A)

A file identifier "fid1" and a data structure identifier "did1" on added side and a file identifier "fid2" and a data structure identifier "did2" on adding side are input (step S31). Manipulation portion 103 retrieves a first data structure identified by the file identifier fid1 and the data structure identifier did1 (step S32). Also, manipulation portion 103 retrieves a second data structure identified by the file identifier fid2 and the data structure identifier did2 (step S33). Then, manipulation portion 103 adds the second data structure to the tail end of the first data structure (step S34). In this case, the element number of the second data structure is zero.

For example, as shown in FIG. 14B, a second data structure 145 is added to the tail of a first data structure 144, so that data structure 144 is altered into a data structure 146.

Figure 15A:
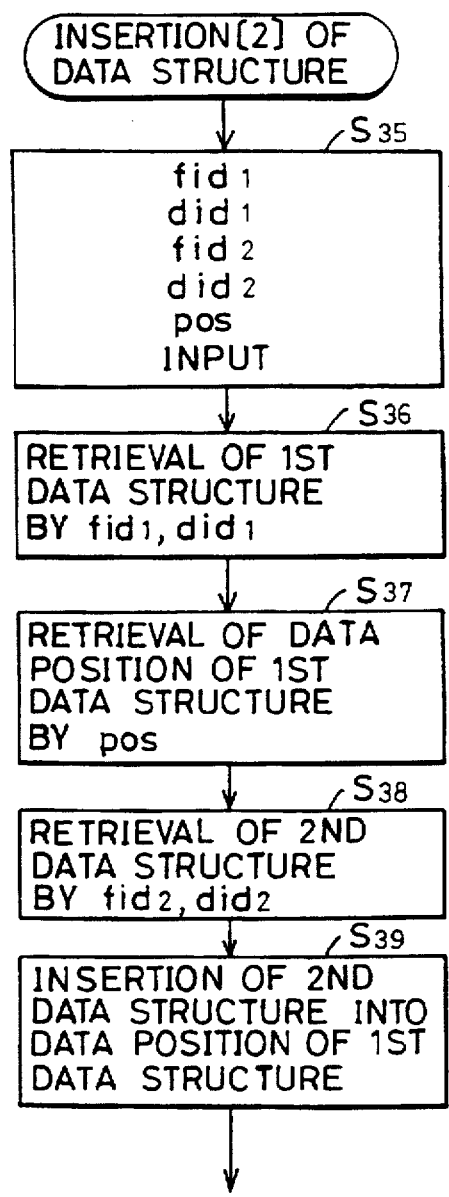
FIG. 15A is a flow chart for use in explaining an insertion [2] function of data structure.

(10) Insertion [2] of the data structure (see FIG. 15A)

A file identifier "fid1" and a data structure identifier "did1" on inserted side and a file identifier "fid2" and a data structure identifier "did2" on inserting side, and a data position "pos" to be inserted are input (step S35). Manipulation portion 103 retrieves a data position destinated by the data position pos in a first data structure identified by the file identifier fid1 and the data structure identifier did1 (steps S36 and S37). Furthermore, manipulation portion 103 retrieves a second data structure identified by the file identifier did2 and the data structure identifier did2 (step S38). Then, manipulation portion 103 inserts the second data structure in the designated data position of the first data structure (step S39). In this case, the element number of the second data structure is zero.

Figure 15B:
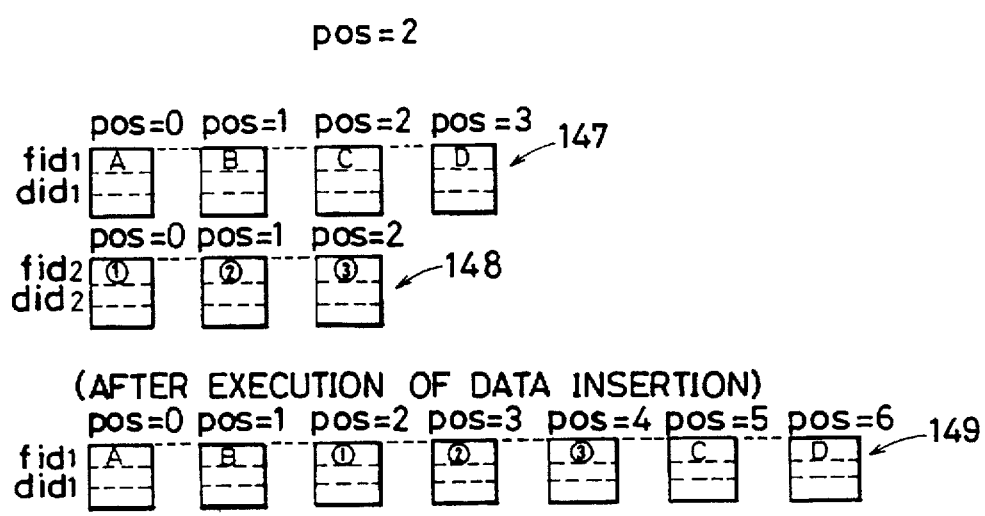
FIG. 15B is a diagram for use in explaining an example of executing the function of FIG. 15A.

For example, as shown in FIG. 15B, when a relation pos=2 is satisfied, a second data structure 148 is inserted in a data position "pos 2" of a first data structure 147, so that data structure 147 is altered into a data structure 149.

Figure 16:
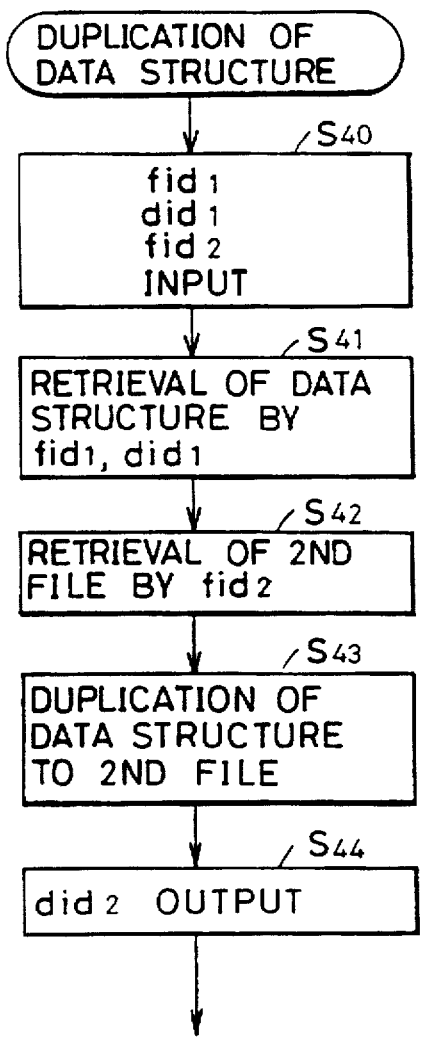
FIG. 16 is a flow chart for use in explaining a duplication function of data structure.

(11) Duplication of the data structure (see FIG. 16)

A file identifier "fid1" and a data structure identifier "did1" at a duplicating source and a file identifier "fid2" at a duplication destination are input (step S40). Manipulation portion 103 retrieves a data structure within a first file identified by the file identifier fid1 and the data structure identifier did1 (step S41). Further, manipulation portion 103 retrieves a second file identified by the file identifier fid2 (step S42). Then, manipulation portion 103 duplicates the data structure identified by the file identifier fid1 and the data structure identifier did1 into the second file, so as to output a data structure identifier did2 relative to the duplicated data structure (steps S43 and S44).

Figure 17:
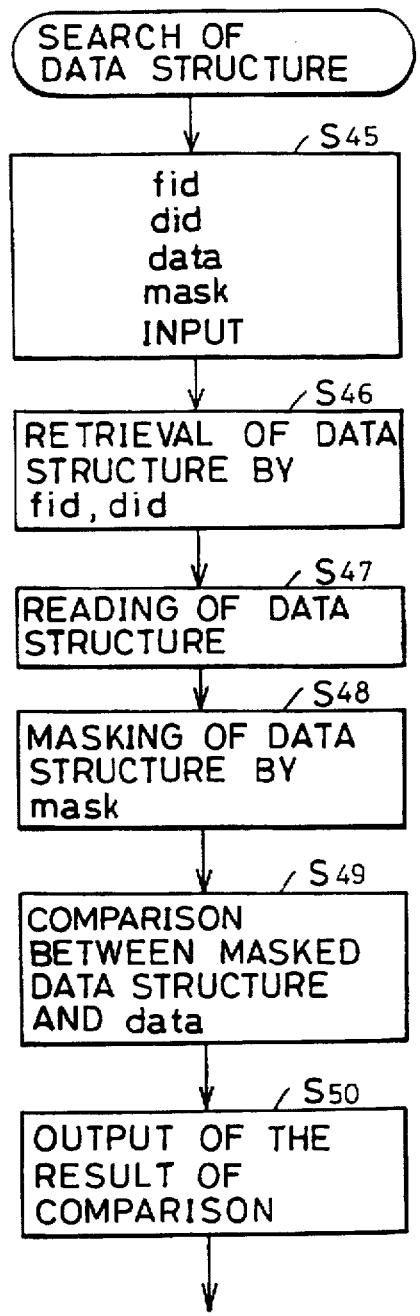
FIG. 17 is a flow chart for use in explaining a search function of data structure.

(12) Search of the data structure (see FIG. 17)

This function is employed when specific data is searched. A file identifier "fid", a data structure identifier "did", comparing data contents "data", and compared mask pattern contents "mask" are input (step S45). Manipulation portion 103 retrieves a data structure identified by the file identifier fid and the data structure identifier did (step S46), and then sequentially reads the contents of each element from a present data position (see FIG. 4) indicated by "ppos" (step S47). Further, manipulation portion 103 performs logical product operation on the contents of each element of the read data structure and the contents of each element of the mask pattern, so as to mask the read data structure (S48) and compare between the masked data structure and the provided data contents "data" (step S49). If there is any matching element therebetween, then manipulation portion 103 outputs the position of the matching element as the result of the comparison. Conversely, if there is no matching element therebetween, it outputs −1 as the result of the comparison (step S50).

(13) Erasure of the data structure (see FIG. 18)

A file identifier "fid" and a data structure identifier "did" are input (step S51). Manipulation portion 103 retrieves a data structure identified by the file identifier fid and the data structure identifier did (step S52) and erases the retrieved data structure (step S53).

(14) Informing of the present position of the data structure (see FIG. 19)

This function is used to inform of the contents of a present data position "ppos" provided for each data structure (see FIG. 4). A file identifier "fid" and a data structure identifier "did" are input (step S54). Manipulation portion 103 retrieves a data structure identified by the file identifier fid and the data structure identifier did (step S55), and outputs the present data position ppos being set in the retrieved data structure (step S56).

In the insertion, the deletion, the reading and the writing of the data structure, when pos is set to −1, then those manipulations are carried out with the present data position ppos, which is being set for an objective data structure, provided as a reference. Executing the foregoing functions (4) through (12) changes the contents of the present data position ppos corresponding to the objective data structure.

(15) Alteration of the present position of the data structure (see FIG. 20)

A file identifier "fid", a data structure identifier "did", the amount of alteration "offset" of a data position and a mode indicating a reference position "mode" are input (step S57). Manipulation portion 103 retrieves a data structure identified by the file identifier fid and the data structure identifier did and alters the contents of the present data position ppos set for the retrieved data structure into the value of a position which is distant from the reference position by the alteration amount "offset" (steps S58 and S59).

When mode=0 is satisfied, the reference position is a leading position of the data structure. When mode=1 is satisfied, the reference position is the present data position indicated by ppos. When mode=2 is satisfied, the reference position is a tail end position of the data structure.

(16) Acquisition of an element number of the data structure (see FIG. 21)

A file identifier "fid" and a data structure identifier "did" are input (step S60). Manipulation portion 103 retrieves a data structure identified by the file identifier fid and the data structure identifier did, and then outputs an element number "num" included in the retrieved data structure (steps S61 and S62).

(17) Acquisition of an element size of the data structure (see FIG. 22)

A file identifier "fid" and a data structure identifier "did" are input (step S63). Manipulation portion 103 retrieves a data structure identified by the file identifier fid and the data structure identifier did, and then outputs the element size "size" of the retrieved data structure (steps S64 and S65).

(18) Acquisition of the number of the data structures (see FIG. 23)

A file identifier "fid" is input (step S66). Manipulation portion 103 retrieves a file identified by the file identifier fid, and outputs the number of data structures included in the retrieved file (steps S67 and S68).

(19) Generation of atomic data (see FIG. 24)

A file identifier "fid", the element size "size" of atomic data, and the contents "data" of elements to be generated are input (step S69). Manipulation portion 103 retrieves a file identified by the file identifier fid, then retains a data area of the element size "size" in the retrieved file, and writes the contents indicated by the contents "data" into that data area (steps S70 and S71). Then, manipulation portion 103 outputs a data structure identifier "did" for identifying the retained data area (step S72).

(20) Reading of atomic data (see FIG. 25)

A file identifier "fid" and a data structure identifier "did" are input (step S73). Manipulation portion 103 retrieves atomic data identified by the file identifier fid and the data structure identifier did and reads the contents of the retrieved data (steps S74 and S75).

Figure 26:
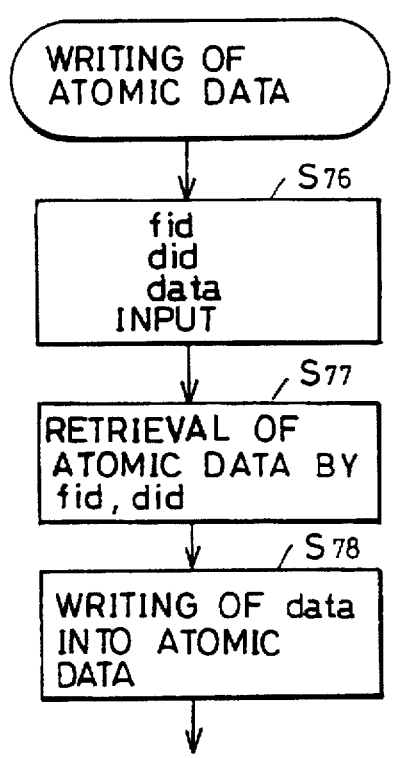
FIG. 26 is a flow chart for use in explaining a function of writing atomic data.

(21) Writing of atomic data (see FIG. 26)

A file identifier "fid", a data structure identifier "did" and the contents "data" of data to be written are input (step S76). Manipulation portion 103 retrieves atomic data identified by the file identifier fid and the data structure identifier did and writes the contents indicated by the contents "data" into the retrieved data (steps S77 and S78).

Figure 27:
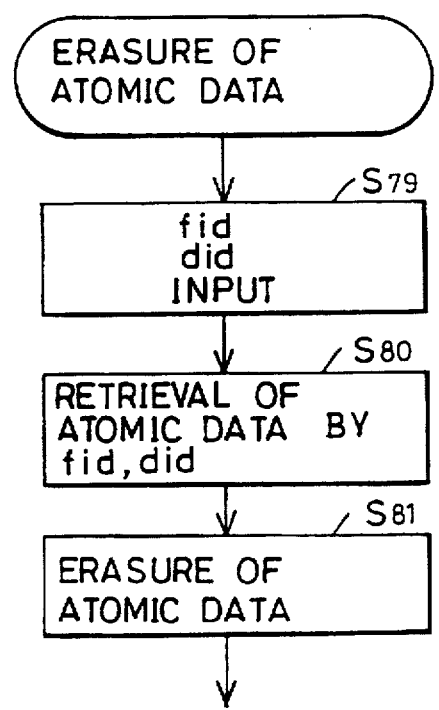
FIG. 27 is a flow chart for use in explaining a function of erasing atomic data.

(22) Erasure of atomic data (see FIG. 27)

A file identifier "fid" and a data structure identifier "did" are input (step S79). Manipulation portion 103 retrieves atomic data identified by the file identifier fid and the data structure identifier did and erases the retrieved data (steps S80 and S81).

The foregoing functions (1) through (22) enable manipulation of each data structure included in each file or the structure of atomic data. Such manipulation of the data structures can be made only by externally applying function names to file management apparatus 101. Accordingly, it is unnecessary to prepare a program for data structure manipulation on the side of the information processing unit or processing system utilizing this file management apparatus 101. Thus, it becomes unnecessary to be associated with an implementation method of data structure manipulation in the information processing unit or processing system utilizing file management apparatus 101, resulting in an improvement in the efficiency of software development.

Moreover, since interfaces between each of processing systems are made clear through the file management apparatus, if only the structure of data to be handled is determined, then parallel development of each processing system is enabled and also independence of each processing system can be enhanced. This makes it possible to replace each processing system by a processing system having more improved functions.

Figure 28:
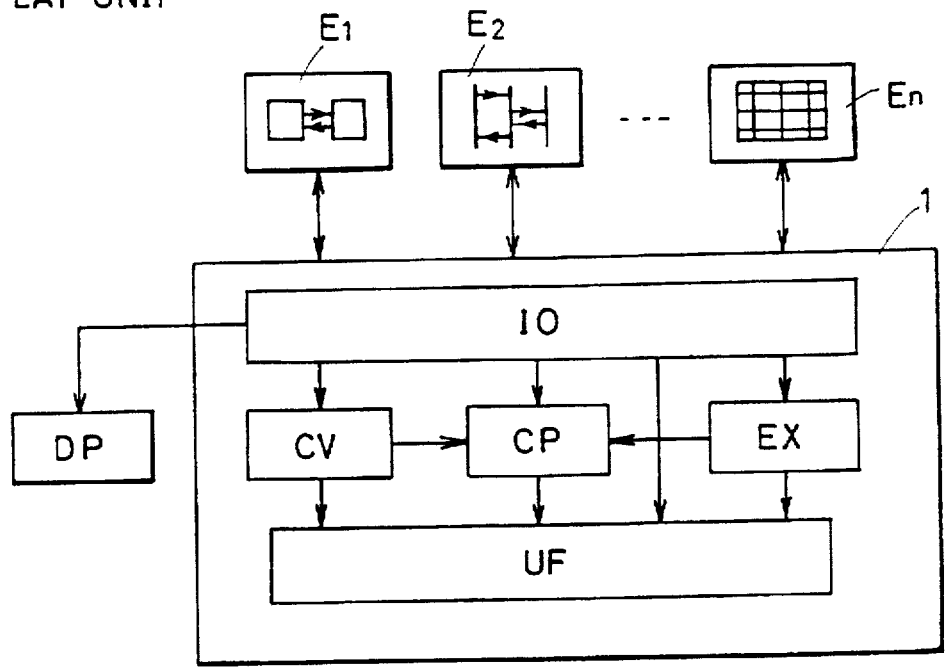
FIG. 28 is a diagram schematically showing the entire configuration of a program development apparatus employing a file management apparatus of the present invention.

FIG. 28 is a block diagram showing an overall structure of a program development apparatus employing the file management apparatus of this embodiment.

In this program development apparatus, the following specification description environments are achieved.

1. A given problem can be described in multi-aspect by using a plurality of graphic representation formats.

2. Specification description information can be related among a plurality of representation formats.

3. Mutual conversion between representation formats can be made.

4. Hierarchical description can be made.

5. Results of execution of a partly completed specification description can be confirmed.

6. A partly completed specification description can be implemented in parts and for reuse.

This program development apparatus includes graphic editors E1–En each having rendering/editing functions according to different representation formats, and a main apparatus 1 for making a program in accordance with specification descriptions given by users.

File management apparatus 101 of the above-described embodiment can be employed as a unified file management unit UF in main apparatus 1.

Each of graphic editors E1–En is preferably implemented in a separate and independent process. Each of graphic editor E1–En is communicatable with main apparatus 1. Why each of graphic editor E1–En and main apparatus 1 are communicatable with each other is that processes of respective graphic editors E1–En and main apparatus 1 are coupled by inter-process communication using sockets, for example, in consideration of the facility of the program development and future function expansion.

The representation formats provided by the graphic editors E1–En include graphic representation formats and non-procedural description formats. The graphic representation formats include representation formats such as a function block diagram, a sequence chart and the like.

Figure 29:
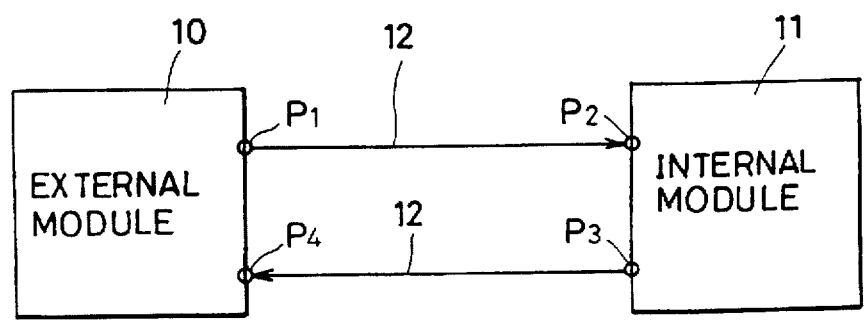
FIG. 29 is a diagram illustrating a functional block diagram being one of specification description representation formats.

The function block diagram is, as shown in FIG. 29, a representation format representing the connection relationship between modules (module is a certain unit semantically united in the software).

FIG. 29 is a diagram showing one example of the specification description format using a function block diagram. In FIG. 29, the data connection relationship between an external module 10 and an internal module 11 is shown. External module 10 is a module for representing an external function which is not an objective of the specification description. Internal module 11 is a module for representing a function which is an objective of the specification description. Between external module 10 and internal module 11, data flow is defined together with input and output ports P1–P4 by data arcs 12.

The internal module 11 includes primitives, and parts (a part is partially completed specification description, which is registered in a file).

Figures 30, 31, 32:
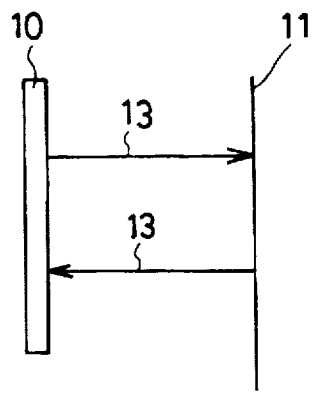
FIG. 30 is a diagram illustrating a sequence chart being one of the specification description representation formats.
FIG. 31 is a diagram illustrating a relation table being one of the specification description representation formats.
FIG. 32 is a diagram illustrating a determination table being one of the specification description representation formats.

The sequence chart is a diagram showing the causal relation in input and output of data, the relation of transmission and receipt of data between modules, and the like as shown in FIG. 30. In FIG. 30, the data flow between external module 10 and internal module 11 is shown. In this sequence chart, a module and the ports are designated by a single sequence line (a vertical line). The sequence line indicates a time axis and also shows the relation in a time sense of signal flows. The flow of data between modules 10 and 11 is indicated by signal lines 13. The signal lines 13 show the connection and causality of data between the modules.

The non-procedural description forms include the representation formats shown in table form such as a relation table and a determination table. The relation table shows relation data structure as shown in FIG. 31. In FIG. 31, The relation table includes a field 14 in which a title of the table is indicated, an item name field 15 in which titles indicating items included in this table are displayed, a field 16 showing a type (int (an integer), float (a floating point) and string (a string)) of the data of the item, and a field 17 in and from which actual data values of the items are inputted and outputted.

A determination table is a representation format indicating the selection structure of a process as shown in FIG. 32. More specifically, the determination table shows in a table the selection structure of data or control, indicating that a function takes what value for a certain data value, for example. In FIG. 32, the determination table includes a field 18 displaying a determination table module name, a field 19 displaying a determination condition, a field 20 displaying a name of a process to be executed as a result of the determination, a field 21 displaying determination for the condition, and a field 22 displaying determination indicating execution and nonexecution of the process based on the condition determination.

In addition to the above-mentioned representation formats, available representation formats include a data block diagram showing the inclusion relation of data, a table manipulation diagram showing the structural data process mainly including relation operations and the like.

Figure 33:
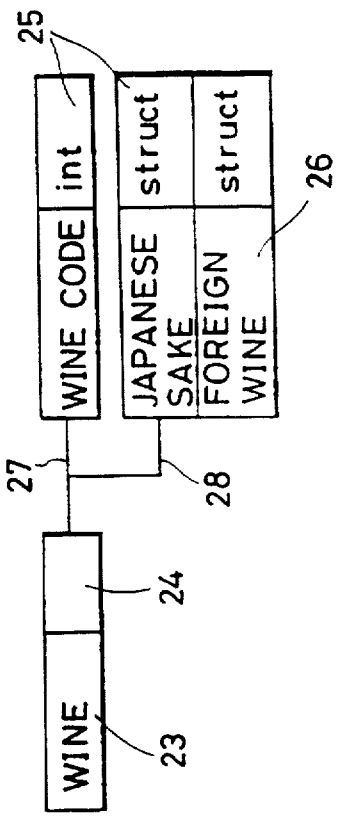
FIG. 33 is a diagram illustrating a data block diagram being one of the specification description representation formats.
Figure 34:
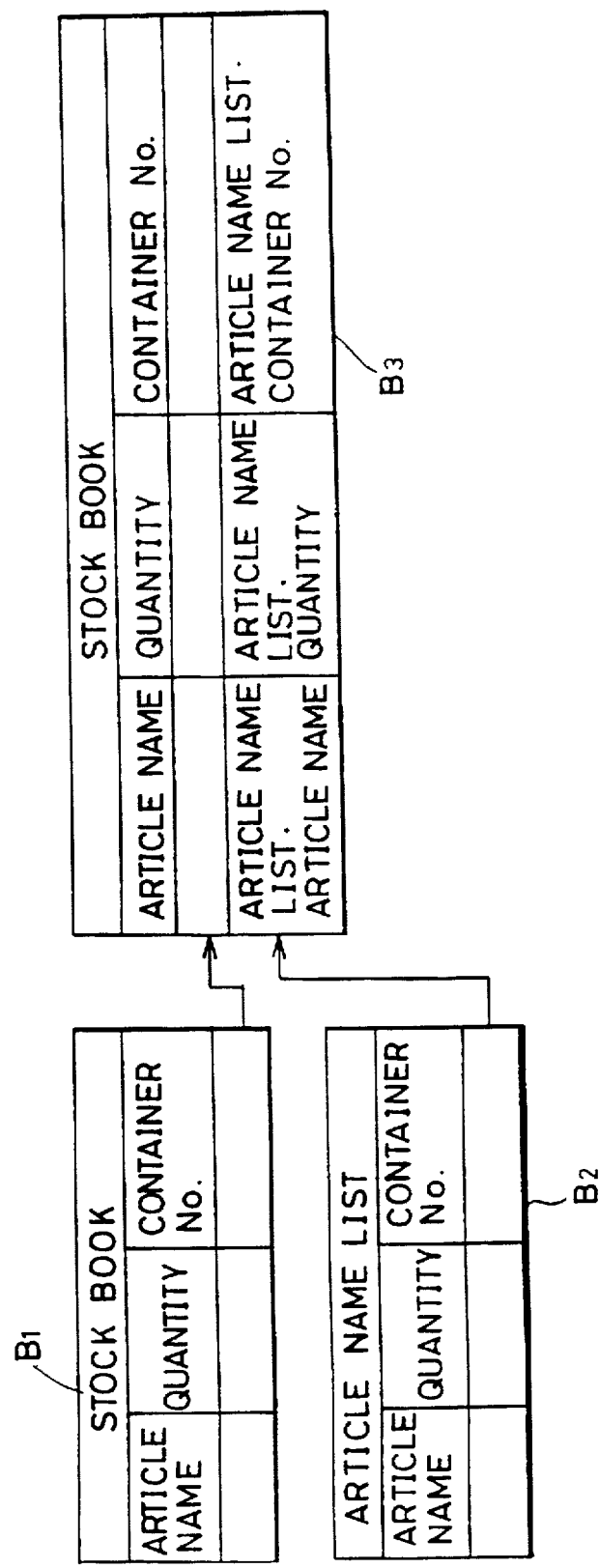
FIG. 34 is a diagram illustrating a table handling diagram being one of the specification description representation formats.

One example of a representation format by a data block diagram is shown in FIG. 33, and one example of the representation format of the table manipulation diagram is shown in FIG. 34.

In FIG. 33, the data block diagram includes a data set name field 23, a field 24 indicating the number of entries included in the data of the field 23, a field 26 indicating names of member data composing the members or the data set names at lower levels of the data set in the field 23, and a field 25 indicating data types (int, float, string, struct) of the member data. The field 25 is described only when the data is of the array structure. When the data type is "struct", it shows the data is made hierarchical for the lower levels. As to each data, the connection relation is shown by an AND connection 27 or an OR connection 28. That is, a data block diagram is a diagram showing the hierarchical relation, inclusion/exclusion relation and the like of the data handled in the system.

The table manipulation diagram shown in FIG. 34 shows a state in which the relation tables B1 and B2 are processed according to a predetermined manipulation to form a new relation table B3. The manipulation is called as union manipulation. The manipulations in a table manipulation diagram include not only the union manipulation, but also various relation operations, sort operations and calculation operations. The relation operation is operation for manipulating a table so that it satisfies a certain relation. The sort operation is a manipulation of re-arranging the rows of a table according to a predetermined order such as the order of alphabets, the order of magnitude of values. The calculation operation is a manipulation for obtaining calculated results such as a total value, an average value and so forth for a particular column of the table.

Returning to FIG. 28, main apparatus 1 includes a mutual conversion unit CV for fusing information obtained from graphic specification descriptions which a user produced employing graphic editors E1–En, to produce construct information containing control information necessary for program execution. The mutual conversion unit CV also performs mutual conversion of information among graphic specification descriptions having different representation formats and production of basic information among module levels for presentation to a user. The main apparatus 1 also includes an execution unit EX for interpreting and executing a program according to the construct information produced in the mutual conversion unit CV and presenting to a user the execution results, an input/output unit IO for managing communication for information exchange among graphic editors E1–En for the graphic specification description, the mutual conversion unit CV, the execution unit EX, the parts management unit CP, and a unified file management unit UF for managing in an unified manner the data structures handled by respective processing units EX, CV and CP.

The parts management unit CP registers a certain partly completed specification description in the software as a "part" and also manages the operation for reutilizing the registered "parts".

The construct information is information obtained by converting produced specification description information so that it corresponds to the operation method of a process model, including control structures. As the process model, a data driven model is employed as an example. For using the data driven model as the processing model, a control node and a control arc must be produced. As to the construct information, a node is associated with a module of specification description information and an arc is associated with data connection between modules.

The input/output unit IO has functions as an interface for a user, of the execution control of respective processing units on the basis of an instruction by the user, and of managing data transmitted and received among respective processing units.

The interface to the user includes the following; (1) the specification description according to a representation format employing a graphic editor, (2) display of mutual conversion result, (3) a mapping function, (4) a citation function, (5) a prototyping function, (6) parts registration and reutilization, and (7) output of documents.

The description of specification by each representation format using a graphic editor may include the following methods.

(a) A user specifies a type of a representation format and a specification description name. The specification description name is specified when reusing the specification description already registered, and a new specification description name is inputted for a new production.

(b) For detailing the specifications already described or under description hierarchically, a graphic element and a representation format are specified within an existing specification description. In this case, the specification description is made using a representation format corresponding to the specified graphic element.

The specification description can be made with different representation formats for the same module. In this case, the mutual conversion unit CV informs an editor of the corresponding representation format according to retrieval to a rule table for mutual conversion therein, and the corresponding converted representation format is displayed for the user. Since the description of a single specification can be made with different representation formats, the described contents can be easily understood on many aspects, enabling production of more complete specifications.

The mapping function is a function of relating semantically equivalent information (e.g., data and data or a function module and a function module) among different representation formats. This function is needed for relating various specification information described independently with each other for sequential unification.

Figure 35:
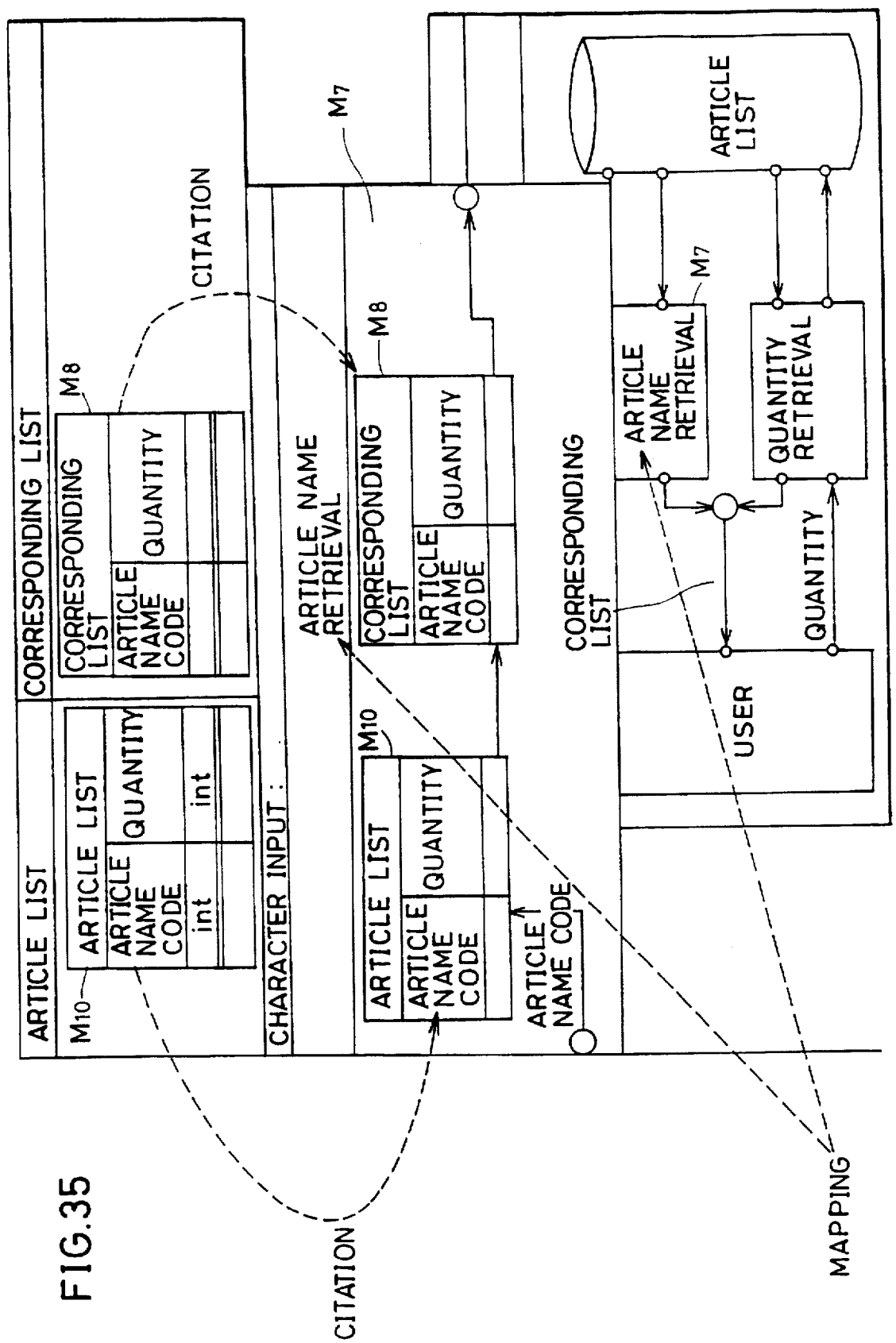
FIG. 35 is a diagram illustrating "citation" and "mapping" manipulations when a specification description is made by employing a plurality of representation formats.

As shown in FIG. 35, the module M7 represented by a function block diagram can also be expressed using a table manipulation diagram. The module M7 represented by the table manipulation diagram and the module M7 by the function block diagram are semantically equivalent to each other. In this case, the modules M7 represented in different representation formats are related as semantically identical, as shown by the arrows in FIG. 35. This manipulation is referred to as "mapping" manipulation.

Information may be shared between different representation formats. In this case, citation of the already described specification information, in description of a specification in another representation format, can reduce the amount of work in the description. To use information described in a certain representation format in another representation format is referred to as "citation". For example, as shown in FIG. 35, the module M10 shown by a relation table is identical to the table (module) M10' represented by a table manipulation diagram. In this case, as shown by the arrows in the same figure, the module M10 of the relation table is cited in description according to the representation format of a table manipulation diagram. Similarly, a table M8 in the table manipulation diagram is the same as the module M8' represented by a relation table. Also, in this case, the module M8 represented by the relation table is cited in description according to the representation format of the table manipulation diagram.

The prototyping function is a function for verifying execution results of partly completed specification description. In the prototyping, the execution results of the specification description can be verified independently for each level. The specifying of the input and output data and production of input data in the prototyping are made by a user in accordance with the specified data structure.

An interface for part registration and reuse instructs the parts management unit CP to register parts and reutilize the registered parts.

With the function of outputting documents, for specification descriptions described in different representation formats, each graphic specification description described in each respective representation format is outputted to a printer as a hard copy which is available as a design document of the software as it is.

Next, the construction of each unit will be described.

Next, referring to FIG. 28, an interface between input/output unit IO and each processing unit. First, each interface with each graphic editor will be described.

Input/output unit IO controls the starting and ending of various kinds of graphic editors specified by a user. Also, it manages information necessary in activation (starting) and finish (ending) of editors such as names of inputted specification description and types of graphic editors. The operations therefor include the following.

(a) When the user specifies a type of representation format and a name of specification description, input/output unit IO activates a graphic editor corresponding to the specified representation format and also simultaneously sends the name of the specified specification description to the activated graphic editor.

(b) Each graphic editor has a function for activating other graphic editors therein. Of the types of graphic elements (graphic elements included in manipulation tools displayed by an editor) specified in a certain editor and a representation format is informed input/output unit IO. A graphic element has symbols different in kind and shape depending on the used type of the representation formats. Input/output unit IO activates a graphic editor corresponding to the specified representation format and also sends the specified graphic element to the activated graphic editor.

(c) Finish control of specification description. Each graphic editor has a manipulation tool for finish. The manipulation tool for finish informs input/output unit IO of finish of the graphic editor. Input/output unit IO effects termination of the graphic editor of which termination is informed of after reserving information such as the name of a produced specification description and the type of the editor in response to the finish informing.

Input/output unit IO also provides interfaces between graphic editors E and mutual conversion unit CV. When a specifications is described employing various representation formats, or when a plurality of specification descriptions are correlatively employed, input/output unit IO performs following processes between graphic editors E and mutual conversion unit CV.

(a) The rendering information described by a user is sequentially transmitted to mutual conversion unit CV through input/output unit IO at the stage where each graphic element is described. Mutual conversion unit CV performs predetermined processes (which will be described latter) according to the information supplied from the input/output unit IO, and then returns the processed information to input/output unit IO. In this case, the returned data includes specification information representable in different representation formats corresponding to the inputted specification description information. The data returned from the mutual conversion unit CV includes an identifier ID of the specification description of the returning destination together with the processed result. Input/output unit IO identifies specification description corresponding to this identifier ID and returns the processed result formed by mutual conversion unit CV to a graphic editor which is the transfer target. Also, if mutual conversion unit CV detects contradiction in the inputted specification description, a message indicating the contradiction detection is presented to the user by input/output unit IO.

(b) Regarding two graphic elements specified by the user on two graphic editors in a specification description process, input/output unit IO makes a determination as to whether the two graphic elements can be logically mapped or not. If the mapping is possible, the input/output unit IO returns identical logical specification information to both of the two graphic editors. If the mapping is impossible, it presents a message indicating the mapping impossibility to the user.

(c) Citation

Upon citation of a specification information among a plurality of graphic editors, input/output unit IO transfers rendering information and specification information of the graphic elements specified by the user on graphic editors to a graphic editor which is a destination of the citation.

Next, an interface between input/output unit IO and an execution unit EX will be described. Input data information and positional information of input and output data necessary in execution (e.g. prototyping) by execution unit EX are transferred from a graphic editor to input/output unit IO similarly to that in specification description. Input/output unit IO hands such information to a handler (not shown) for execution which performs pre-process of the execution. When the pre-process is terminated, the execution unit EX is activated in response to an execution start instruction by the user. Data of the execution result is displayed on display unit DP through input/output unit IO from the above-mentioned handler for execution. The display on display unit DP is executed by activating a routine for output result display, for example.

The interface between input/output unit IO and parts management unit CP includes the following.

(a) Interface in parts registration

At the stage where the specification description produced by a user is partially completed, the specification description information and parts name which are registration objectives specified by the user are transmitted to parts management unit CP through input/output unit IO.

(b) Interface in parts reuse

The parts name specified by the user on a graphic editor is transmitted to parts management unit CP through input/output unit IO. Parts management unit CP retrieves parts information corresponding to the applied parts name through the management unit UF and returns the retrieved parts information to an activated graphic editor through input/output unit IO.

When a user wants to make reference to the parts information, input/output unit IO activates a parts specification display routine under an instruction from the user to display the graphically represented parts information on display unit DP.

The function of mutual conversion unit CV will be described. The mutual conversion unit CV has a function of unifying the contents of the specification description described by the user using various graphic representation formats to generate a program in an effective execution format and also of converting the information obtained on a particular aspect (a representation format or level) of a supplied specification description into another representation format. Here, the execution format program is a program obtained by converting construct information having a structure depending on the process model (a data driven type model) so as to match with an execution format of a virtual machine.

Figure 36:
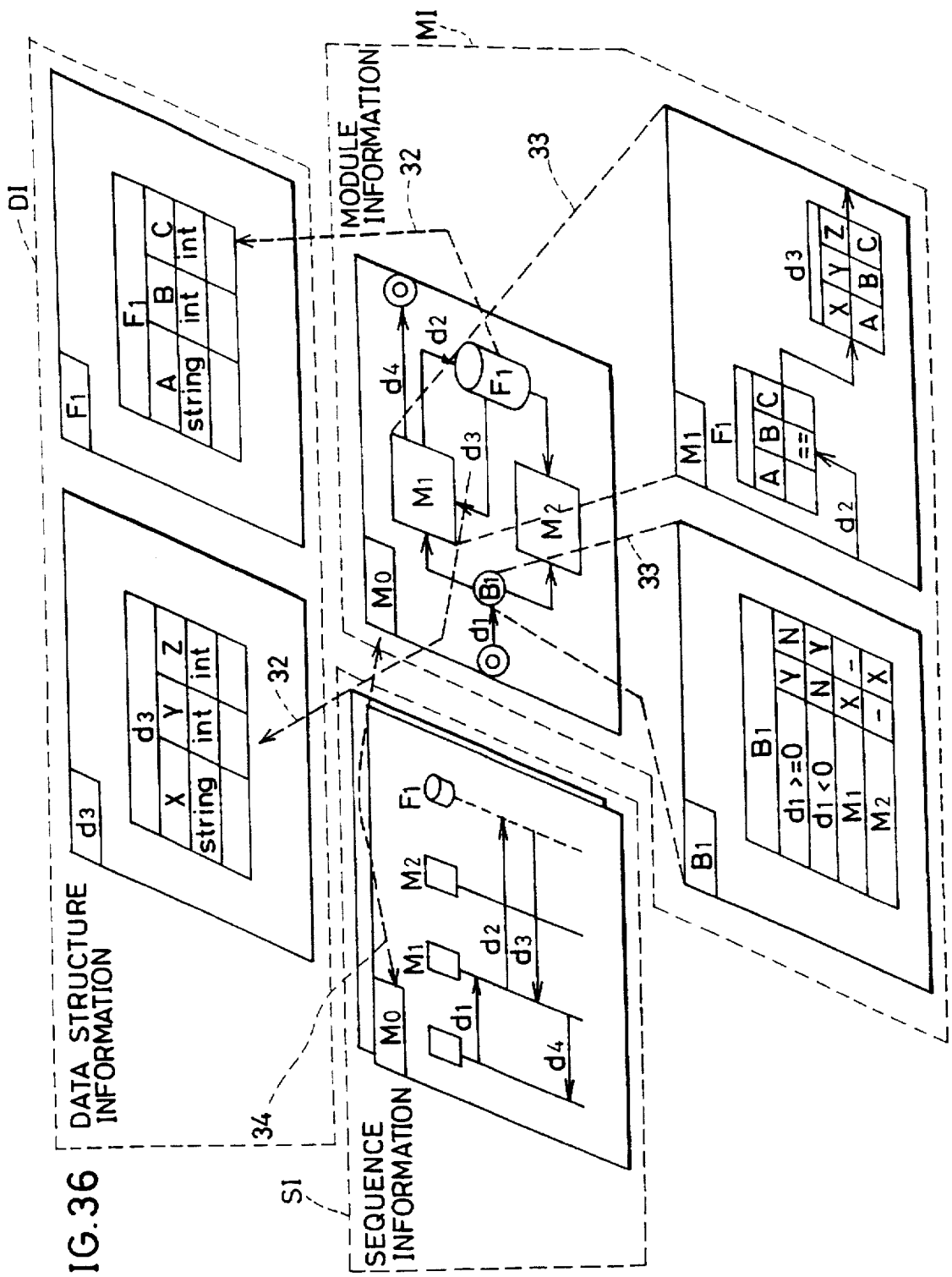
FIG. 36 is a diagram showing one example of the construction of specification describing information.

One example of the structure of specification description information unified by mutual conversion unit CV is shown in FIG. 36. The specification description information includes module information MI, sequence information SI and data structure information DI.

The module information MI is information related to operation of individual module constituting the software system and data connection among modules. The module information generates hierarchical relationship among respective modules on the basis of the specification description with a function block diagram. The module information also unifies data structure information through data connection relationship among modules. The module information includes information about a function module, a determination table module and a structural data manipulation module, respectively. The information of modules respectively correspond to processed contents which can be defined in each representation format of a function block diagram, a determination table and a table manipulation diagram represented by graphic editors. Each module will be described below.

(A) Function Module:

The function module includes information of internal sub module constituting a module and information related to data connection relationship among sub modules. The attribute of sub module information corresponds to a description element provided by a function block diagram, which includes primitive, parts, internal module, file, branch, and confluence. The hierarchical structure of a module is reserved by applying a submodule ID (identifier) attached to a module of which detailed information is defined by the sub module.

The data connection relationship among modules is made corresponding to arcs in a function block diagram. The arc indicates relationship between data producing sub module and data consuming sub module. The data structure is managed in a manner so that the data structure information is referred to with data set ID.

(B) A determination table module is information indicating information related to a selection process by a process implemented according to the condition determination and the determination result on the basis of the information obtained from a determination table.

The relation between contents of each conditional determination and a corresponding process to be executed is managed by an event ID.

(C) The structural manipulation module information is information indicating with objective data of a manipulation and manipulations operating upon each data the information related to the structural data manipulation on the basis of the information obtained from a table manipulation diagram. The correspondence relation between the objective data of the manipulations and each manipulation is managed by data IDs and manipulation IDs. The data structure of each data is managed in a manner of referring to the data structure information by the data set ID.

The data structural information is information related to the definition of type and structure of data consumed and produced in the software system. The hierarchical relation of a data structure is produced on the basis of the description employing a data block diagram. The data structure information includes inclusive data structure information and relation data structure information, and also includes atom information as data having no structure.

(A) The inclusive data information is information indicating structure of data in inclusive or exclusive relation. The inclusive data information has a data set ID to be given to a data structure defining a detailed structure for each component data to reserve the hierarchical relation of the data structure.

(B) The relation data structure is information indicating basic data type of each item data constituting the relation data.

(C) The atom information is information indicating a basic data type (int, float, string) related to an atom data.

The sequence information includes information about the attribute of a sequence line and a signal line inputted to and outputted from the sequence line. In the sequence information, a plurality of sequences can be defined for a single module, so that the relation thereof is managed by a sequence ID.

(A) The sequence line information is information indicating the attribute related to a vertical line indicating a sub module in a sequence chart. The attributes of sequence lines include an internal module, file, each of which corresponds to a description element of the sequence chart. The corresponding relation to sub modules in the module information is managed with module sub IDs.

(B) The signal line information is information showing data connection (hereinafter, referred to as a signal line) among sequence lines in the sequence chart. The signal line information also shows the causal relation of input and output data by managing information of a group of output sequences simultaneously outputted in connection with inputs of a signal line. The corresponding relation to the data dependency in the module information is managed by arc ID.

As described above, the relationship between pieces of information at respective portions constituting the specification description information is all managed with identifier IDs. The identifier ID includes, as described above, data set ID identifying data structure information, module ID identifying module information, module sub ID identifying an internal sub module constituting a module, arc ID identifying data connection among internal sub modules. Every time addition of new information occurs, mutual conversion unit CV produces new identifier ID for management.

As shown in FIG. 36, in the constitution of specification description information, specification contents described employing a plurality of graphic editors are made hierarchical and also include data reference relation 32, module hierarchical relation 33 and common definition information relation 34 for the same module. Accordingly, on the basis of such relations, the specification description information of the entirety of the objective software system can be produced from a partial specification description defined in a plurality of different representation formats.

The specification description information integrating each information obtained by the individual representation format is managed with identifiers IDs as described above. Examples of the data structure of the specification description information obtained by unifying information obtained from such individual representation format is shown in FIGS. 37 through 42.

Figure 37:
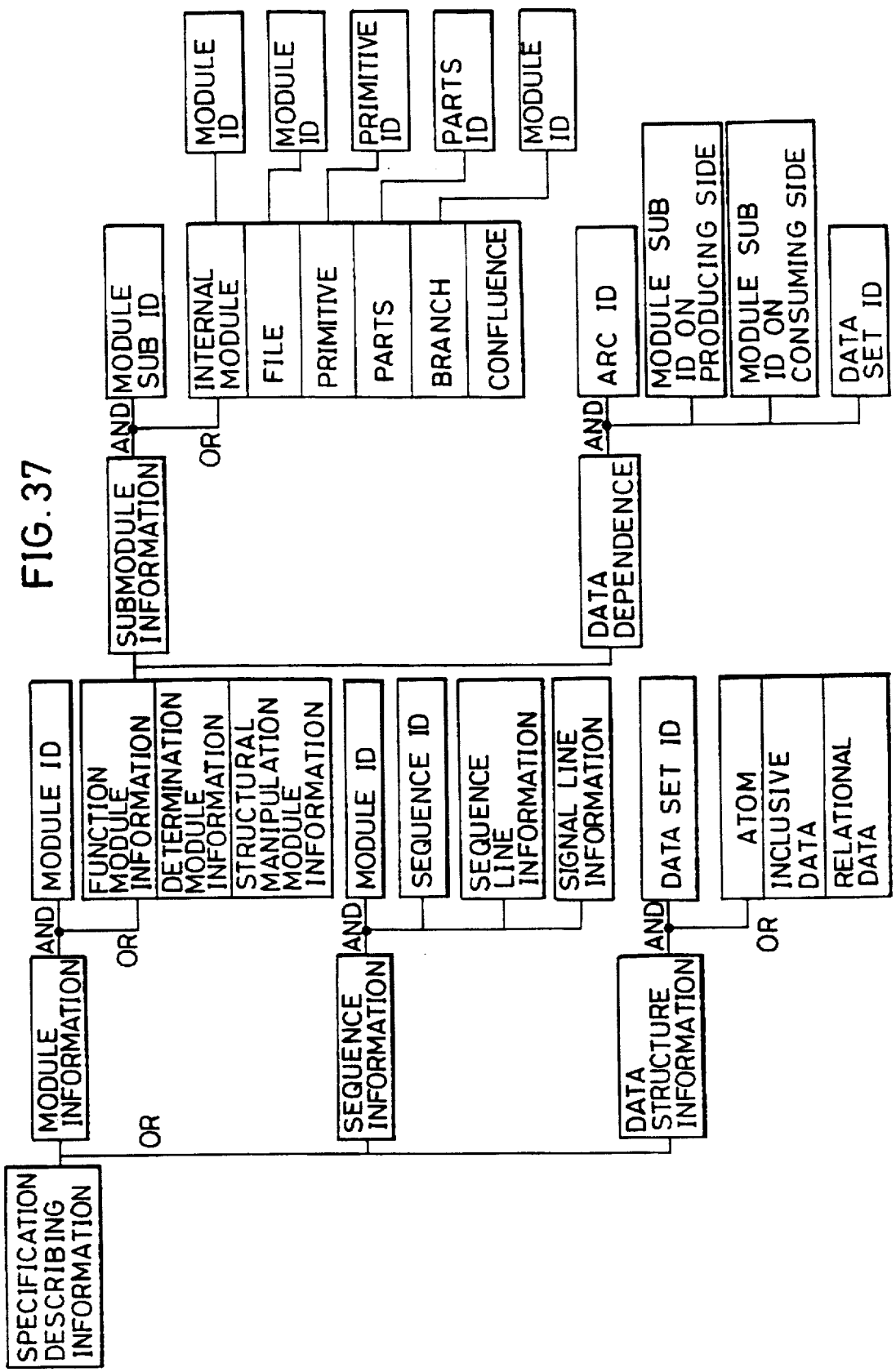
FIG. 37 is a diagram showing a list of the construction of specification describing information.
Figure 38:
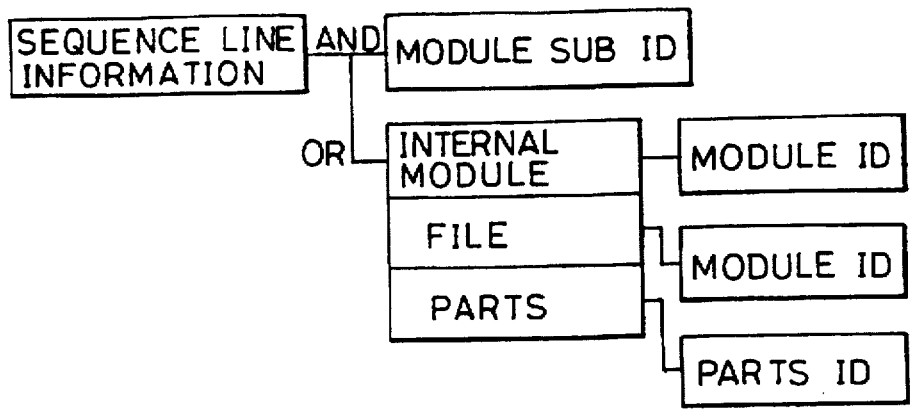
FIG. 38 is a diagram showing the construction of sequence line information included in the specification describing information.
Figure 39:
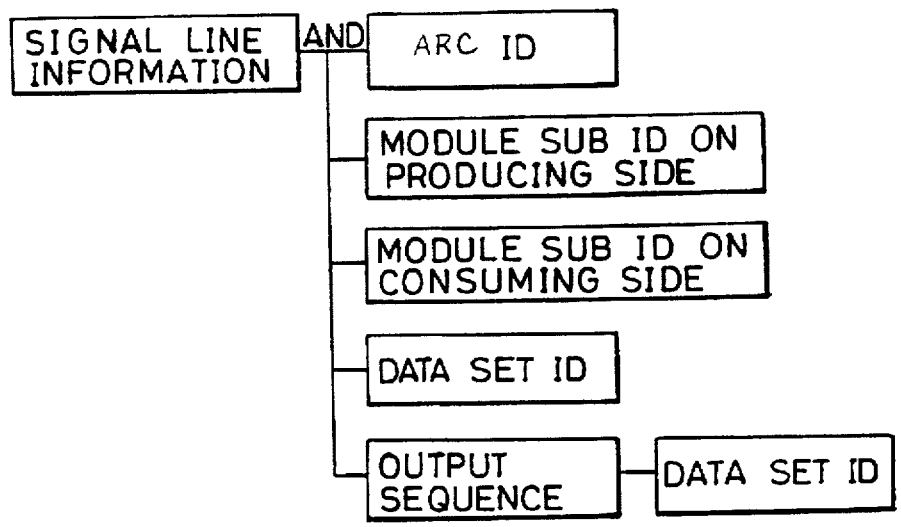
FIG. 39 is a diagram showing the construction of signal line information shown in FIG. 37.
Figure 40:
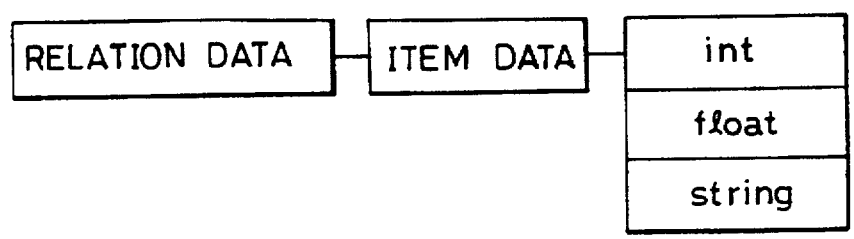
FIG. 40 is a diagram showing the construction of relational data shown in FIG. 37.
Figure 41:
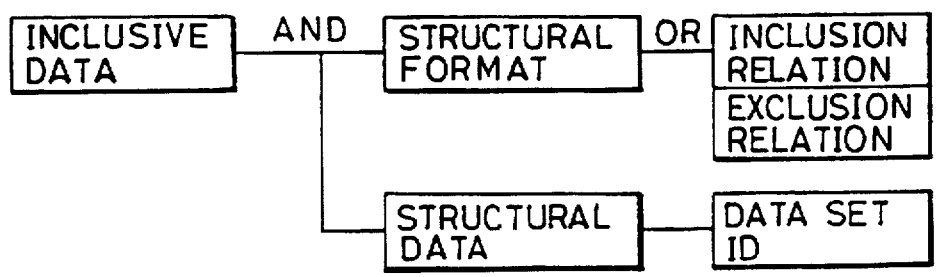
FIG. 41 is a diagram showing the construction of inclusive data shown in FIG. 37.
Figure 42:
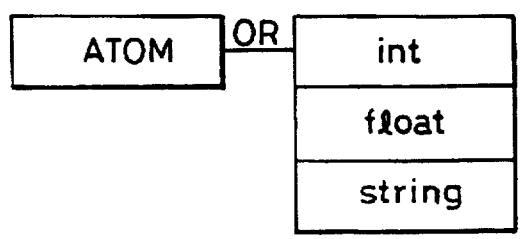
FIG. 42 is a diagram showing the construction of an atom shown in FIG. 37.

FIG. 37 shows a data structure in specification description, FIG. 38 shows a structure of sequence line information, FIG. 39 shows a structure of signal line information, FIG. 40 shows a structure of relation data, FIG. 41 shows a structure of inclusive data and FIG. 42 shows a structure of atom. In the structures of specification description information shown in FIGS. 37 through 42, by referring to the identifier ID attached to each information, correspondence/incorrespondence and modification/no-modification are determined.

Figure 43:
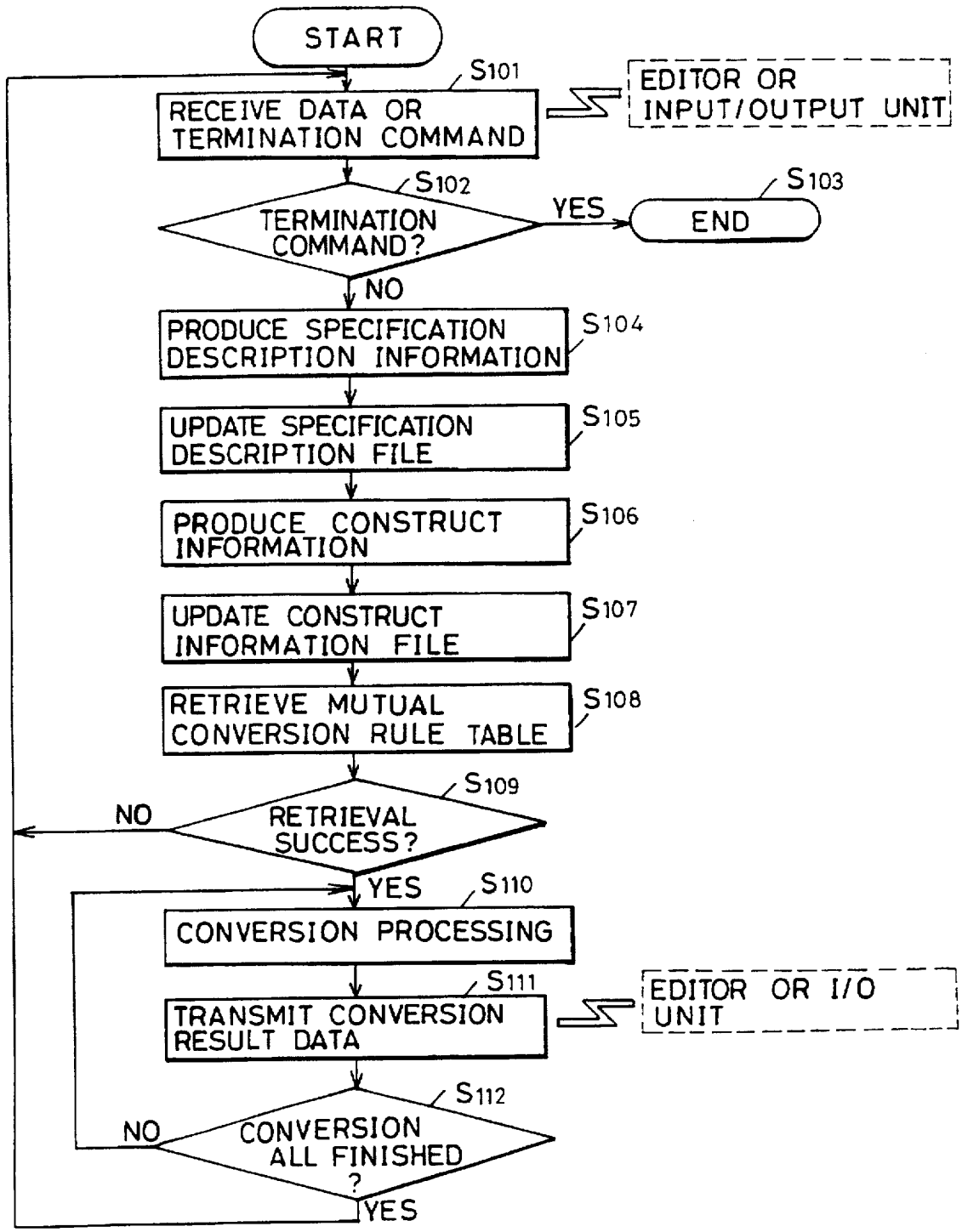
FIG. 43 is a flow chart showing an operation of a mutual conversion unit.

FIG. 43 is a flow chart showing operation of a mutual conversion unit. Referring to the operation flow chart of FIG. 43, the operation of mutual conversion unit CV will be briefly described below. The generation of specification description information is done on the basis of the communication with an editor through input/output unit IO.

In step S1, data is supplied from an editor E or the input/output unit IO. The data is specification description information, termination command information, or specification description production start information. If the supplied information is determined to be the termination command (step S2), the mutual conversion unit CV performs a desired process such as closing of a file, and then the operation is terminated.

If the supplied data is not termination command, mutual conversion unit CV produces necessary specification description information according to the supplied data (step S4). An access is made to file management unit UF employing the produced specification description information, and the contents of the file for the specification description information are updated by the produced specification description information (step S5).

On the other hand, mutual conversion unit CV produces construct information from the supplied specification description information (step S6). As for the produced construct information, management unit UF again, and the construct information file is updated through addition or modification of the newly produced construct information by accessing the file.

Next, mutual conversion unit CV retrieves the rule for conversion previously stored in a form of a table. By the retrieval to the rule table for conversion, a determination is made as to whether there exists data having the identical meaning to that of the input data. That is, it is analyzed whether information received from a certain editor can be converted into an object in another graphic representation format (the correspondence relation of a module of a function block diagram and a vertical line of a sequence chart, for example) (step S9).

When an object convertible into another representation format is retrieved by the analysis, it is converted into the convertible corresponding graphic object (step S10), and the data indicating the converted graphical object obtained as a result of the conversion is transmitted to a corresponding editor through input/output unit IO (step S11). The editor receiving the data transmission is an editor capable of representing the converted object. After the conversion process is all finished (step S12), mutual conversion unit CV waits for transmission of semantically completed graphic object from the editor or the input/output unit again.

If no convertible graphic object exists in step S9, mutual conversion unit CV informs input/output unit IO of the fact and waits for the data from an editor E or input/output unit IO.

If a single graphic object semantically completed is updated when data is inputted as a result of specification description by a user through input/output unit IO, the single completed graphic object is transmitted to mutual conversion unit CV.

When a convertible graphic object is retrieved in step S9, if a plurality of convertible graphic objects exist, graphic editors providing representation formats corresponding to the plurality of graphic objects respectively are activated. The graphic elements of respective representation formats provided by the simultaneously activated graphic editors are simultaneously displayed on display unit DP with multiwindows, for example.

Figure 44A:
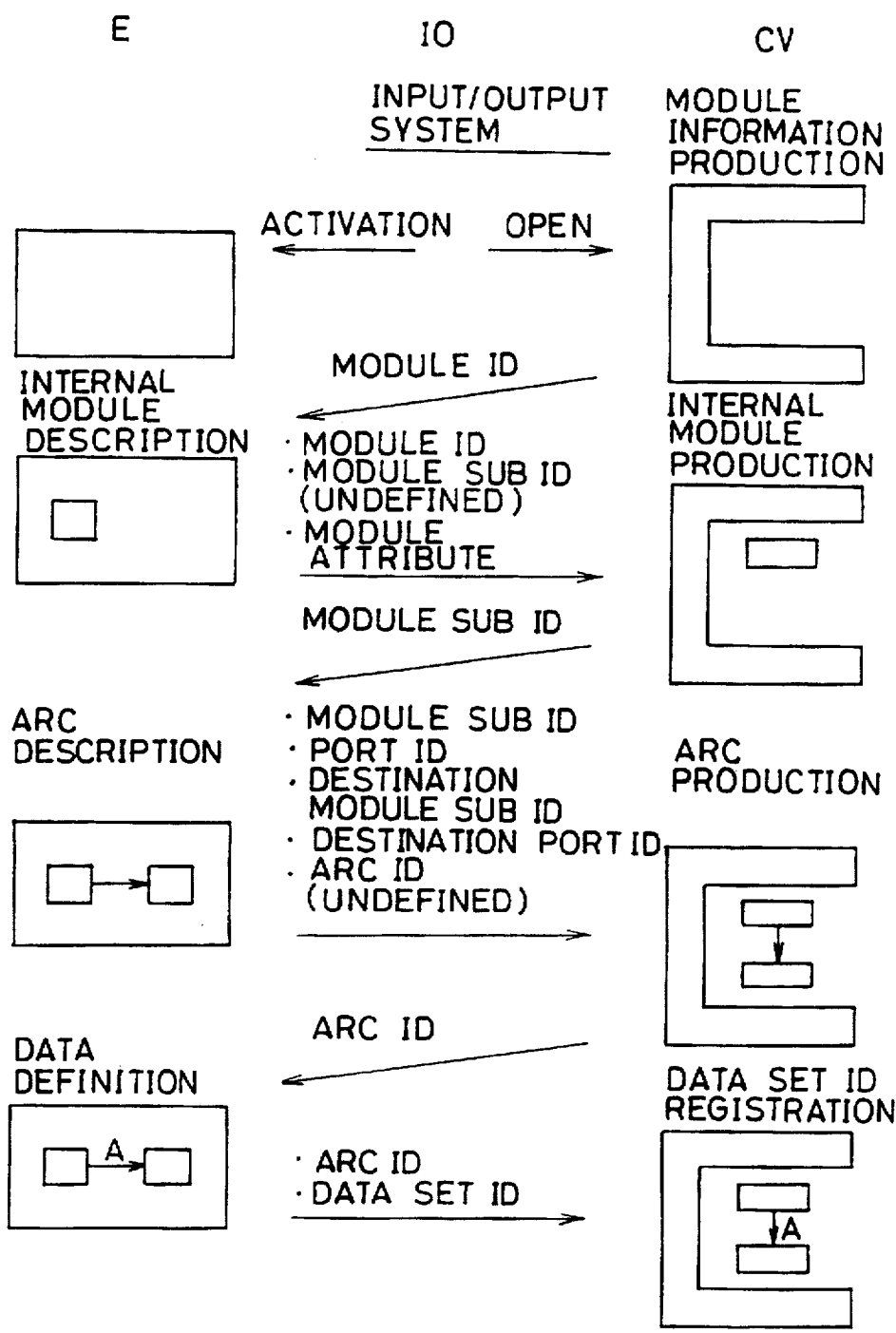

Next, an example of information exchange between graphic editor E and mutual conversion unit CV will be described referring to FIGS. 44A and 44B. In the example shown in FIGS. 44A and 44B, a case is described as an example in which a graphic editor with a function block diagram as a representation format is activated and mutual conversion unit CV produces specification description on the basis of the representation format of the function block diagram.

In response to the activation of an editor for the data structure definition or the module definition made by a user through input/output unit IO, mutual conversion unit CV produces new module information or data structure information. A type of the produced module or data is determined from a type of the activated graphic editor. Simultaneously, for such produced module information or data structure information, mutual conversion unit CV produces a module ID or a data set ID and transmits it to the activated graphic editor. In FIG. 44A, the module ID is transferred to the graphic editor E.

In the graphic editor E, when the user adds a new internal module on the editor, the graphic editor E transfers undefined module sub ID to mutual conversion unit CV together with the transferred module ID and information indicating the attribute of the module. Mutual conversion unit CV produces an internal module in response to the received undefined module sub ID and also produces and transfers to the graphic editor E module sub ID for identifying the new sub module information.

In the graphic editor E, if modification or elimination of information about the existing internal module in the function block diagram is done, the modification or elimination information is transferred to mutual conversion unit CV together with corresponding module sub ID. Mutual conversion unit CV modifies or eliminates the corresponding sub module information in response to the transferred information.

When a plurality of internal modules are produced, an arc indicating the connection relation of data among the internal modules is described on the graphic editor E. In response to that, the graphic editor E transmits to mutual conversion unit CV a module sub ID identifying a module which transmits data, a port ID indicating a data output port of the internal module, a module sub ID of a destination module for receiving data, a destination port ID which identifies a port at which the destination module receives the data and an undefined arc ID. Mutual conversion unit CV produces an arc in the internal module in response to the received information, and also adds predetermined information to the transferred undefined arc ID and transmits it to the graphic editor E as arc ID for identifying the arc. Next, when the data structure for the arc to be identified with the arc ID is specified, the graphic editor E transmits a data set ID indicating the specified data structure together with the corresponding arc ID to mutual conversion unit CV. Mutual conversion unit CV registers the data set ID according to the received information. Next, referring to FIG. 44B, operation for producing a module of hierarchical structure will be described.

For an existing internal module in a function block, when a user activates another graphic editor to define details of the existing internal module, a lower level module ID (undefined) for identifying a module to be newly added is responsively transmitted to the conversion unit CV together with module ID and module sub ID from the activation source graphic editor which causes the activation of another editor. The conversion unit CV produces new module information in response to the supplied information and also adds the module ID of the higher level module at that time to the produced module (the lower level module). Thus, the lower level module ID is determined.

The module ID of the produced module (the lower level module) is transmitted to the activated editor for defining the details and also transmitted to the editor which causes activation. Subsequently, when the description for the lower level module is completed, the module ID, module sub ID and the lower level module ID are transmitted to mutual conversion unit CV together with the information for indicating the completion from the activated graphic editor. Conversion unit CV produces combined information of the higher level module and the lower level module in response to the supplied information. Information of module ID corresponding to the lower level module is transmitted to mutual conversion unit CV according to the sequence of the internal module information modification from the graphic editor causing the activation. Thus, the hierarchical structure of the module information is implemented as reference relation from both of the higher level and the lower level sides by the identifier ID.

The reference relationship between data and data structure information in the data dependency of a manipulation is implemented as described below. On mapping manipulation in a plurality of graphic editors, the correspondence relationship between an arc and data structure description is established, and then the data set ID obtained at that time is transmitted to mutual conversion unit CV according to the sequence of modifying the data dependency information. Thus, the structure of input and output data in a module is reserved, which enables extraction of the access sequence to and the locking range of the structural data.

As described above, in all the specification description information forming each module, the relationship among each piece of part information is managed by managing the identifiers ID.

An example of production of specification description of the entirety of a software system by the hierarchical representation will be described.

Figure 45A:
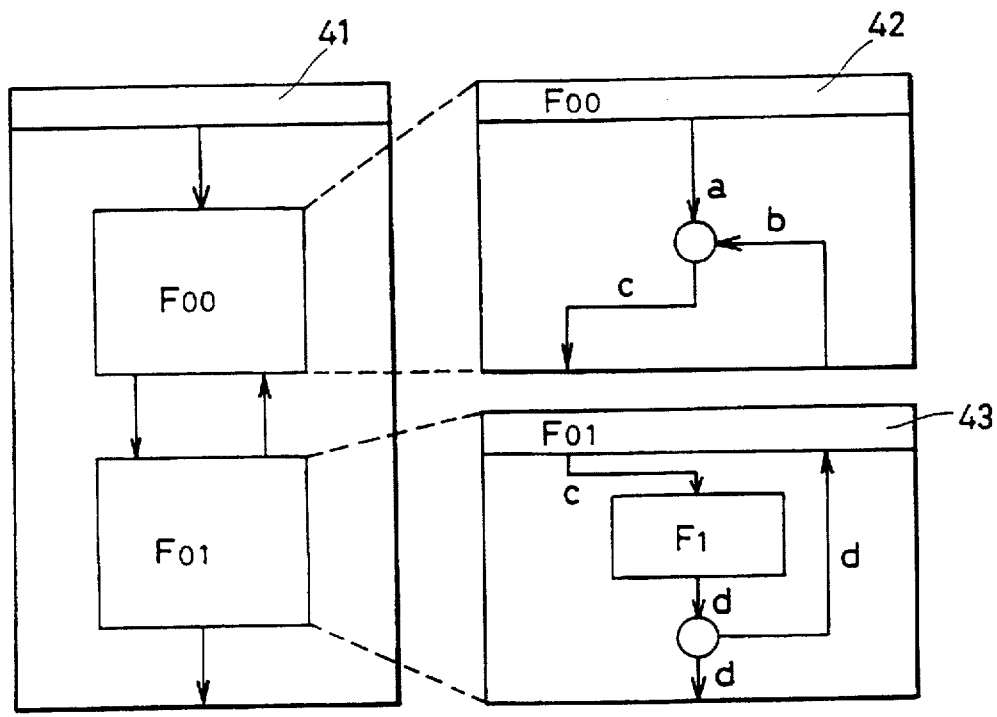
FIGS. 45A and 45B are diagrams illustrating the manner in which construct information is generated from combinations of a plurality of graphic representation formats.
Figure 45B:
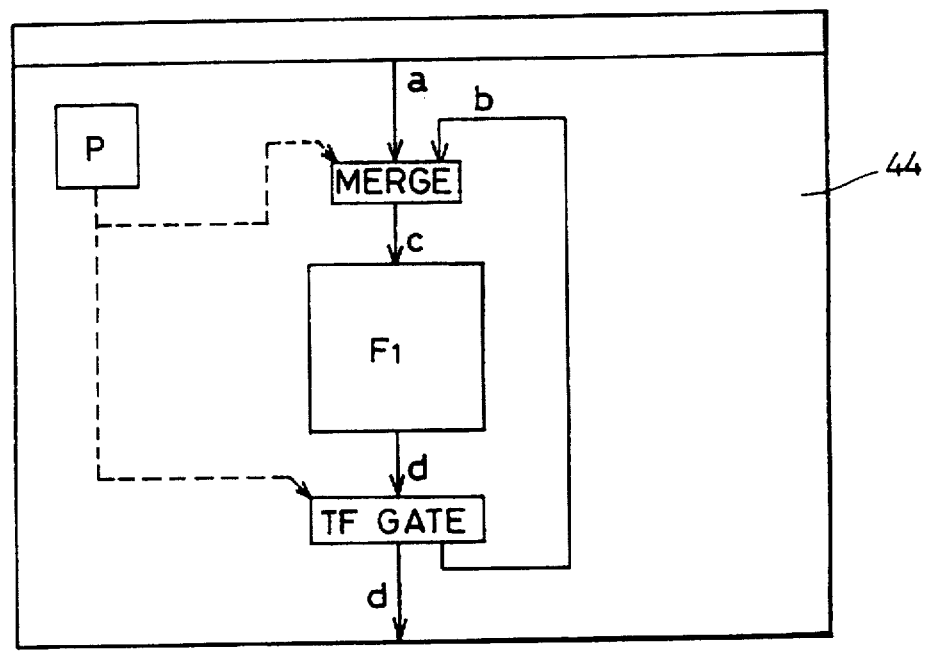

FIGS. 45A and 45B are diagrams illustrating an example of the case of producing more precise module information from hierarchical structural information. As shown in FIGS. 45A and 45B, detailed descriptions 42 and 43 by the lower levels of each module are formed for contents represented as the transmission and reception relation of data between module F00 and module F01 (FIG. 45A) in the specification description 41 of the higher level.. By associating them in mutual conversion unit CV (FIG. 45B), the structure is analyzed in which module F00 merges data a and data b to derive data c, while module F01 receives data c and outputs data d and also returns the output d to module F00. In this way, a repeating structure 44 can be extracted in which the input data b and output data d of the function modules are identical data and the data d is repeatedly utilized again.

In FIG. 45B, the function module indicating "merge" and "TF gate: truth/false determination gate" intactly transmitting data are operationally controlled by function module P. As to the control contents, the details of the control contents become clear by employing lower level modules for the function module P.

Figure 46A:
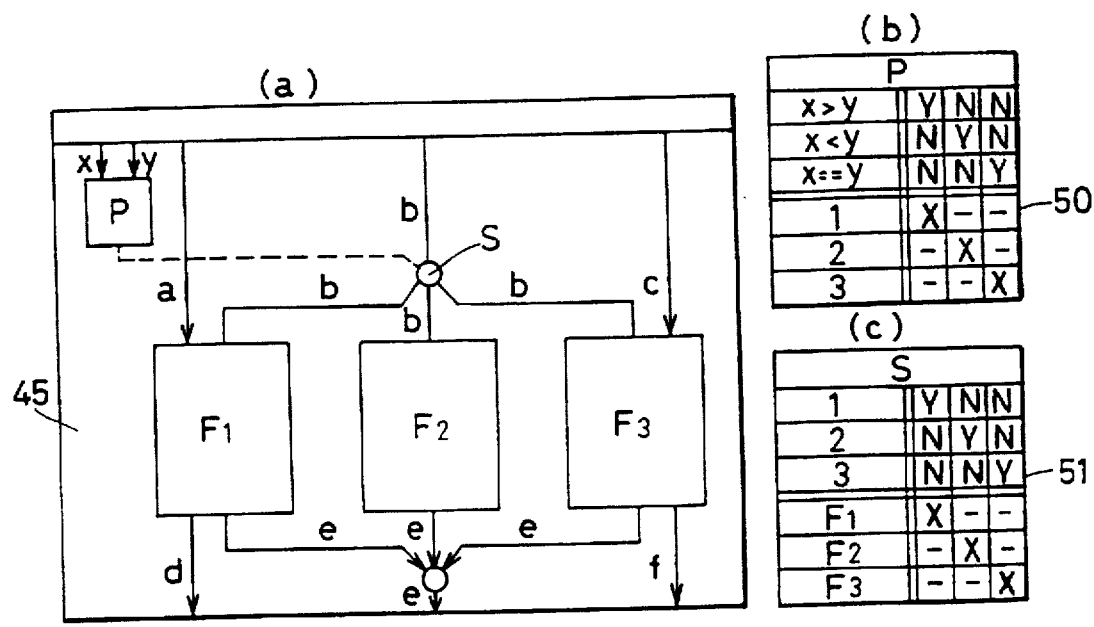
FIGS. 46A and 46B are diagrams illustrating another manner in which construct information is generated from the combinations of the plurality of graphic representation formats.
Figure 46B:
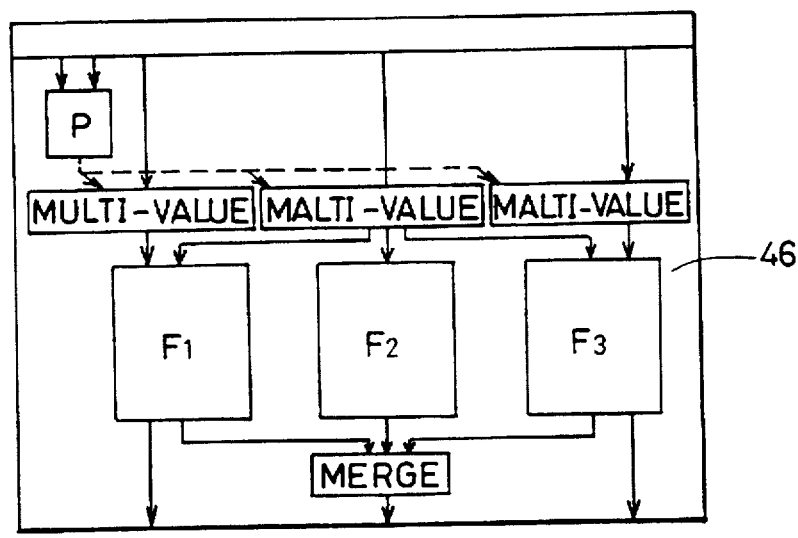

FIGS. 46A and 46B are diagrams showing one example of structure for producing construct information from a combination of graphic representation formats (specification description) performed in the mutual conversion unit CV. In the specification diagram 45 represented by a function block diagram of FIG. 46A, the operation contents of modules P and S can not be determined as to whether it is for simply forming data copy or for selection structure. However, by mapping the descriptions 50 and 51 of the determination table to respective modules P and S, the structure is determined in which module P controls branch module S so that any of modules F1–F3 can be selected according to the magnitude relation of data x, y, and branch module S transmits data b to any of modules F1–F3 according to the data from the module P. Thus, the selection structure of module P is determined and furthermore production of control information for branch control in the branch module S is allowed. Thus, production of construct information 46 including control information for the process model is then allowed (FIG. 46B).

In the above-described embodiment, a case where information for construct production is obtained by unifying a plurality of representation formats is shown. However, it is also possible to reversely produce (mutual conversion) the information in each individual representation format from the unified information as shown in FIGS. 47, 48A and 48B.

Figure 47:
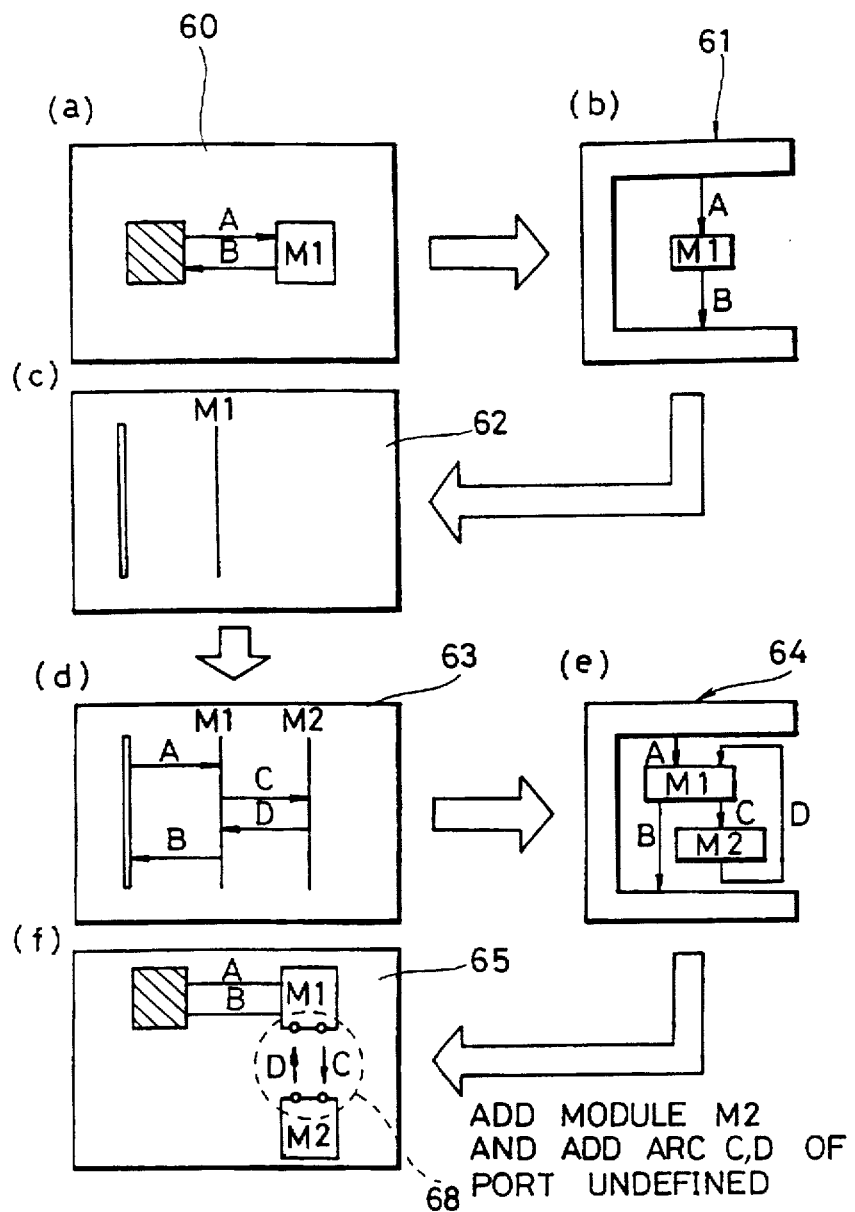
FIG. 47 is a diagram illustrating a mutual conversion manner between a functional block diagram and a sequence chart executed in the mutual conversion unit.
Figure 48A:
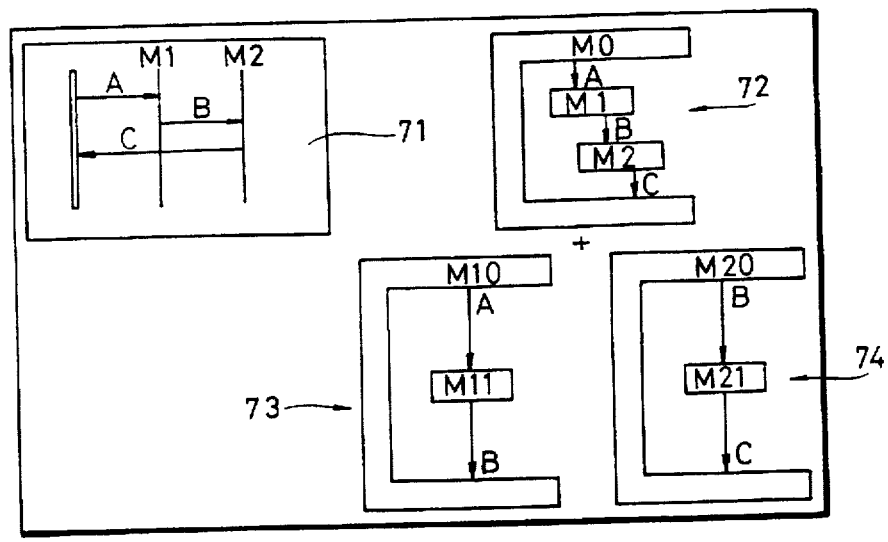
FIGS. 48A and 48B are diagrams illustrating one example of the manner in which lower hierarchical information in a hierarchical description of sequence specification information is generated by utilizing a mutual conversion function between a sequence chart and a functional block diagram.
Figure 48B:
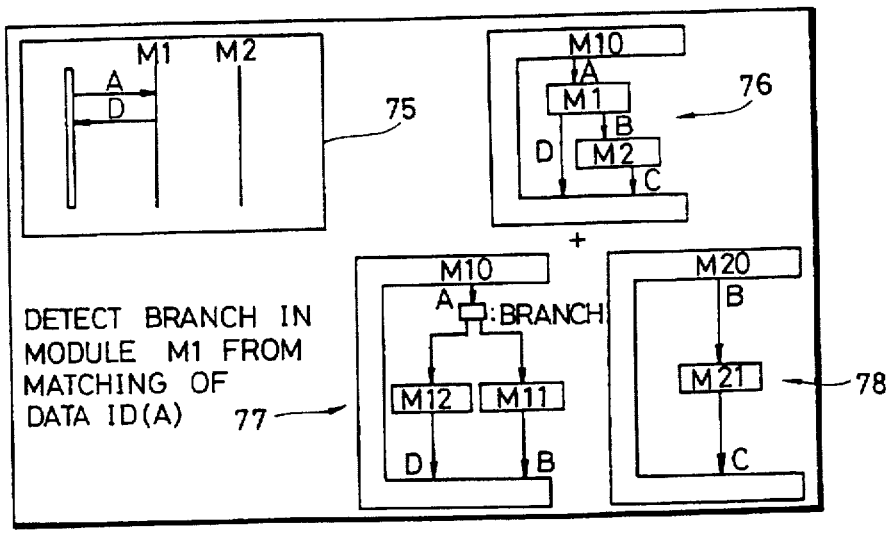

FIG. 47 is a diagram illustrating mutual conversion between a function block diagram and a sequence chart. In FIG. 47, the internal module information 61 (FIG. 47(b)) obtained from a function block diagram 60 is converted into a sequence line information 62 (FIG. 47(c)), and a sequence line on the sequence chart is produced according to the sequence line information (FIG. 47(d)). The conversion from the internal module information to the sequence line information is performed in mutual conversion unit CV as described above, and the information is transmitted to a graphic editor having a representation format of the sequence chart. The graphic editor is then activated to produce the sequence line on the sequence chart on the display unit. In the description below, the information exchange is also made between the mutual conversion unit, and a graphic editor representating a function block diagram and a sequence chart.

An internal module M2 is further added to the sequence line information 62 obtained from the sequence chart 60 in sequence chart 63 (FIG. 47(d)). The sequence line information showing the newly produced internal module is converted into internal module information of a function block diagram and an internal module is produced on the function block diagram (FIG. 47(e)). Then, signal line information obtained by forming signal lines in the sequence chart (signal lines A–D) is converted into data dependency information. Thus, in the function block diagram 64, an arc corresponding to the produced signal line is produced. Thus, the data flow among respective modules is determined. However, the signal line information simply indicates the data flow and does not indicate to which port of the module a connection is made, so that display 68 indicating that the port connection is undefined is presented to a user in the function block diagram 64 newly produced (FIG. 47(f)). The user sees it and defines the port.

In FIG. 47, an initial state 62 of the sequence chart is produced from information 60 obtained from the function block diagram. Furthermore, addition of description, or production of an internal module and addition of data flow are made to the sequence chart 62 in the initial state, and the contents of the function block diagram is additionally produced according to the description 63 of the added sequence chart to obtain a new function block diagram 65. In this case, in the newly produced function block diagram 65, description of new information can be facilitated by presenting a user with incomplete portion 68 in the function block diagram in which a port is undefined, which enables to construct a software system more precisely.

Furthermore, by using a mutual conversion process, information of a lower level in the hierarchical description can be produced.

In the specification description shown in FIG. 48A, a function block diagram 72 is produced from the information represented by a sequence chart 71, and a lower level module 73 for the module Ml and a lower level module 74 for the module M2 are respectively formed in the function block diagram 72. For the mutual conversion structure, if a new sequence chart 75 is provided (FIG. 48B), that is, if a structure in which the module M1 receives data A from the external module and transmits data D is described, mutual conversion unit CV adds the information obtained in the sequence chart 75 to an already described module 72. In this case, by detecting matching of data ID's for the data A, it is recognized that the module Ml receives data A and outputs data B and D. With this structure, by considering the lower level module 73 of the hierarchical representation, it is detected that module Ml has branching structure in its lower level structure and includes lower level modules M11 and M12 respectively outputting data B and data D. In this case, module M2 reserves, for the relationship between data B and data C, that of the sequence chart 71, and its lower level structure 78 has the identical representation to that of the lower level module 74.

Figure 49A:
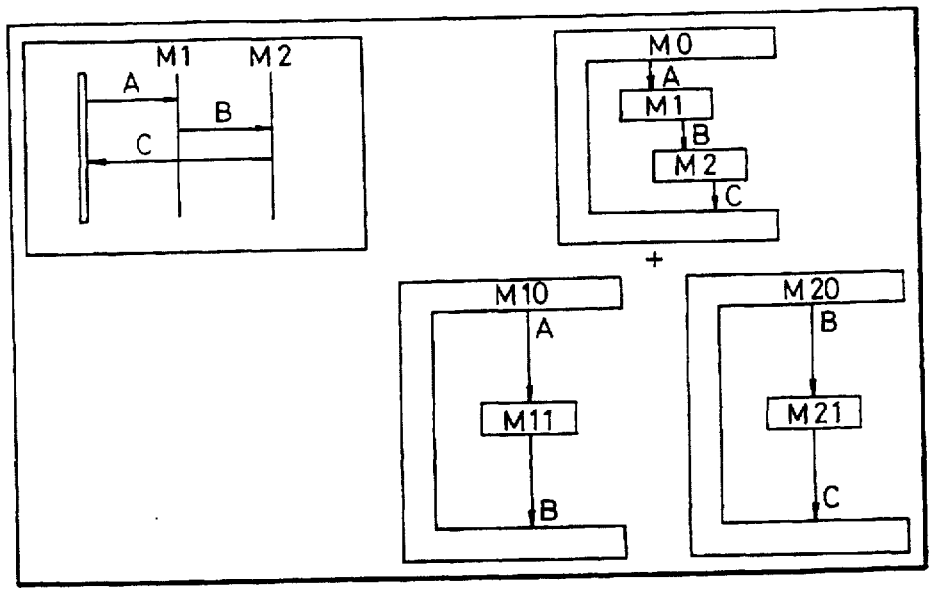
FIGS. 49A and 49B are diagrams illustrating another manner in which lower hierarchical information in a hierarchical description of a specification description is generated by utilizing the mutual conversion function.
Figure 49B:
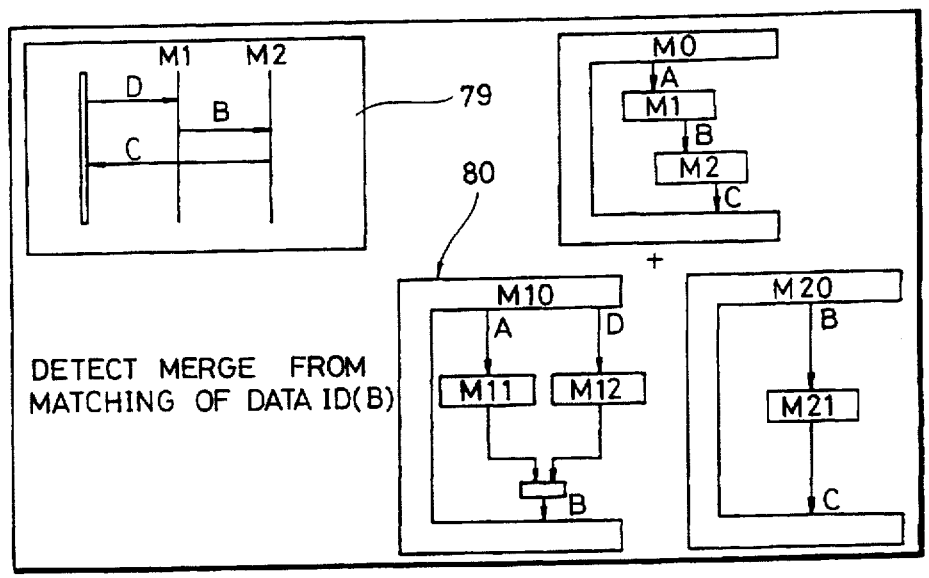

Furthermore, if a new sequence chart 79 is formed for the sequence chart 71 shown in FIG. 48A, (FIG. 49B), a function block diagram is obtained according to the information obtained by the formed sequence chart 79. In this case, as shown in FIG. 49B, by detecting matching of data IDs for the data B, if the data A and the data D have exclusive data structure with each other, such a merge structure 80 is produced for module M1 that comprises a lower level structure in which lower level module M11 receiving data A and lower level module M12 receiving data F2 are provided and outputs of modules M11 and M12 are merged to output data B.

Next, functions of the execution unit EX will be described. The execution unit EX includes a conversion unit for converting construct information produced in mutual conversion unit CV into an executable program according to the operation method of an execution model (a virtual machine) and an execution portion for executing prototyping.

The execution format information obtained by converting the construct information is generally divided into connection information representing the flow of processes represented by the data flow and representing structure of each process, constant information appearing with a link of numbers (various IDs) in the connection information, data structure information and file information. The connection information is also completed for each level in this execution format information, the node number is uniquely produced while maintaining the relationship in which corresponding ports are linked with each other among levels.

Figure 50:
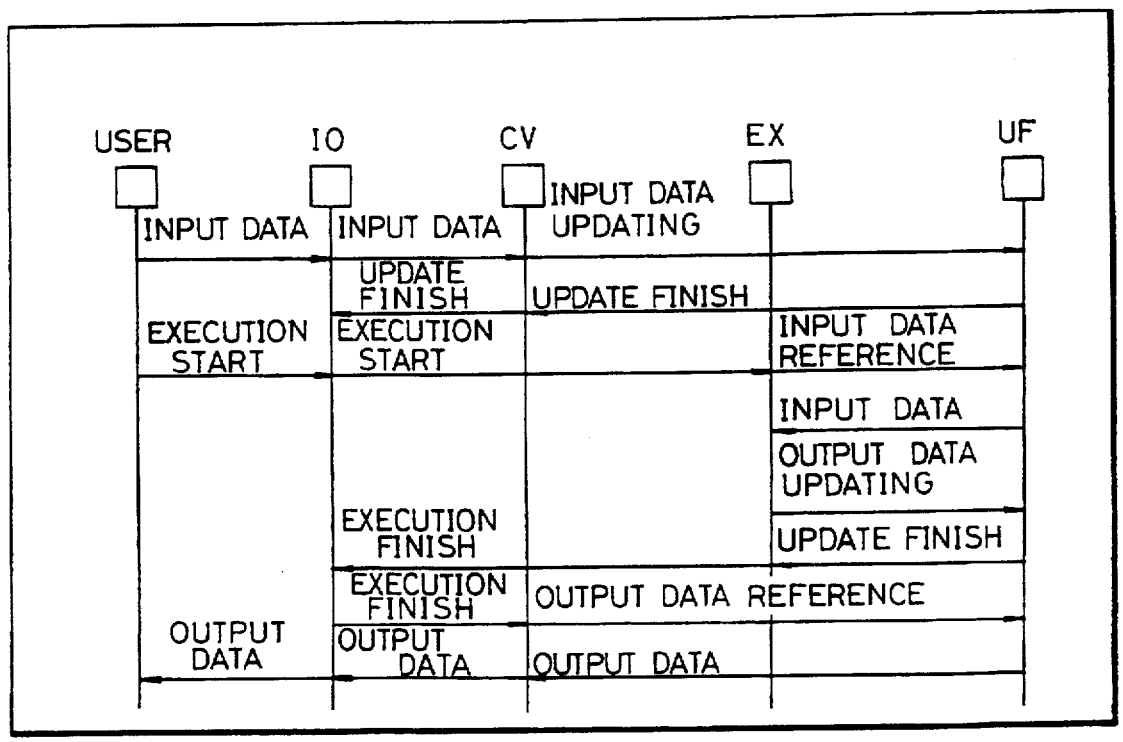
FIG. 50 is a sequence chart showing a prototyping operation.

When the execution portion in execution unit EX executes a predetermined specification, connection of nodes are traced for sequential execution of a program. Accordingly, the conversion into information formats suitable to the execution means conversion into information format in which the connection relationship among nodes is shown by the information of the arcs added to the respective node information. Next, operation of execution unit EX will be described referring to FIG. 50 which is an operation flow diagram thereof. In FIG. 50, an operation flow of execution unit EX is shown using a sequence chart. The user specifies a data arc to which data should be inputted on the specification description. A graphic editor corresponding to the specified data arc is activated, an input window is opened to be displayed on display unit DP. A template corresponding to the data structure of the specified data arc is displayed in the input window. Setting of the input data is made so as to fill up the template. Setting of output data is made similarly to the setting of input data, in which a data arc of which data is to be monitored is specified on the specification description, an output window is opened and a template corresponding to the data structure of the specified data arc is displayed.

The input data specified by the user is written into unified file management unit UF through input/output unit IO and mutual conversion unit CV, and updating of the input data is made. When the management of data updating is terminated in the file management unit UF, information indicating the completion of the updating is transmitted to input/output unit IO through mutual conversion unit CV. The user instructs for the start of prototyping execution, and then the execution instruction is provided to execution unit EX through input/output unit IO. The execution unit EX refers to an area in which the input data set in the input window is written in the unified file management unit UF, to read out the input data and execute the program corresponding to the specified specification description.

The execution unit EX reads the input data from the unified file management unit UF, sequentially executes functions set in nodes while tracing connections of nodes included in execution format information, and obtains output data when the outputting is designated for an arc of the output data. Execution unit EX obtains the output data and then writes the output data in unified file management unit UF. Thus, the output data is updated.

Unified file management unit UF informed execution unit EX of the completion of updating the data and then input/output unit IO has the execution completion of prototyping informed of from execution unit EX. Input/output unit IO receives the execution termination instruction, and then informs the conversion unit CV of the execution termination. Mutual conversion unit CV refers to the output data written in unified file management unit UF in response to the execution termination, and reads and transmits the output data to input/output unit IO. Input/output unit IO displays the supplied output data in an output window previously opened on display unit DP.

As described above, the execution of simulation for an arbitrary level in specification description is made simply by setting an input data and an output data format. That is, introduction of an input data at an arbitrary level selected and observation of a selected, desired result data can be done integrally with the description of a specification. Thus, an environment is implemented in which the verification for matching between the contents of a described specification and the intention of a user is aided, and also confirmation of the specification, reconfirmation of overs and shorts therein and so forth can be easily performed.

A certain completed specification in a specification description is referred to as "parts". The parts management unit CP for managing the parts includes the following functions.

(1) a function of presenting parts information, (2) a function of presenting a parts name list, (3) presentation of an item data type of a table, (4) presentation of construct information, (5) a parts specification display function, (6) a function of registering parts, (7) a function of extending parts. Input/output unit IO, mutual conversion unit CV and execution unit EX can access the parts management unit CT.

Description will now be given on a reference operation of parts with reference to FIG. 51.

Figure 51:
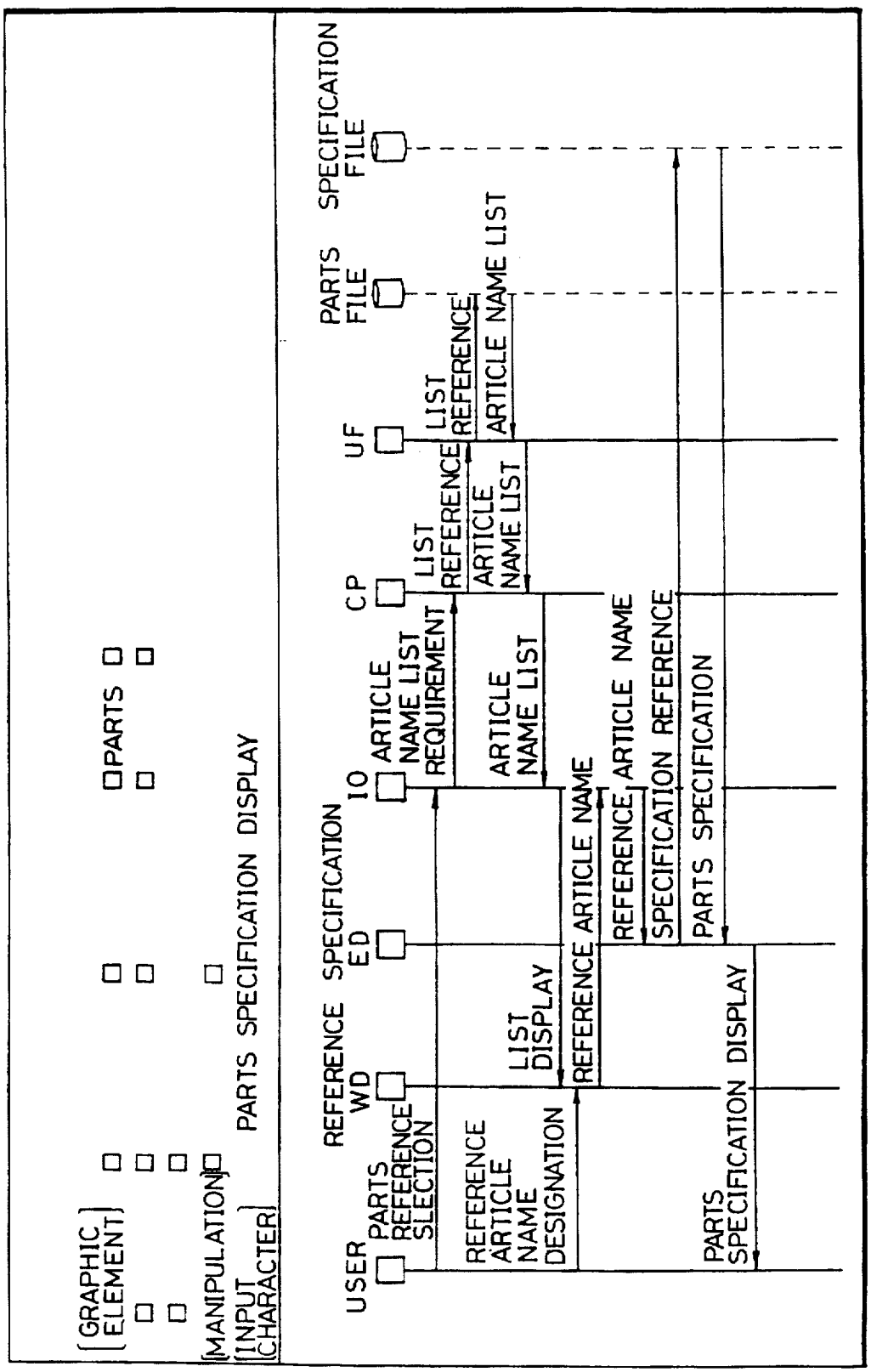
FIG. 51 is a sequence chart showing a parts reference operation.

FIG. 51 is a diagram showing, in a sequence chart, the reference operation flow of parts. When referring to parts, the user selects "parts reference" from a menu applied by input/output unit IO. Input/output unit IO responds to this "parts reference" instruction to require parts management unit CP to prepare a part name list in order to display the list of registered parts. Parts management unit CP searches for a parts information file through file management unit UF to transmit the registered parts name list through parts management unit CP to input/output unit IO. Input/output unit IO activates the graphic editor to open a window for parts reference (reference WD) and display the list of the registered parts onto the display unit.

The user designates the parts that he or she intends to refer to input/output information out of the parts indicated in the parts reference window (reference WD) by employing, e.g., a data input unit such as a "mouse" or a character input unit. Input/output unit IO responds to the reference parts designation by the user to activate a parts specification editor (specification ED) and deliver the designated parts name to this parts specification editor.

The parts specification editor (specification ED) refers to a parts specification file stored in a specification file and displays the parts specification referred to. This makes it possible for the user to see a parts specification at a graphically represented specification describing level on display unit DP.

Description will now be made on a parts citation operation.

When parts are cited while specification description is being carried out, "parts" are selected in a rendering mode of a functional block diagram editor or a sequence chart editor. The editor citing the parts outputs a requirement of parts requiring information to input/output unit IO. Input/output unit IO responds to the user's instruction to open a window for parts citation and display a list of registered parts in the same manner as in the above-described parts reference operation.

The user designates the ones that he or she intends to cite out of the parts indicated in the parts reference window. Input/output unit IO requires parts management unit CP to provide parts information with respect to the designated parts. Parts management unit CP searches for a parts information file through file management unit UF to provide the parts information with respect to the instructed parts to input/output unit IO.

Input/output unit IO provides the parts information applied by parts management unit CP further to the editor that intends to cite the parts. The editor carries out rendering on the basis of the applied parts information and also informs input/output unit IO of alteration of the specification description contents.

Description will now be made on the function of unified file management unit UF. Information with respect to the contents of specification description handled by this development apparatus is represented as a single unified file. The function of manipulating this file is implemented as a data structure manipulating instruction by unified file management unit UF. Unified file management unit UF has interfaces which are declaratively coupled between other processing units (input/output unit IO, mutual conversion unit CV, execution unit EX and parts management unit CP) for executing accesses (generation, reference, updating, deletion, etc.) to an internal data structure representing information with respect to the specification description, and integrally manages the internal data structure representing the specification describing information.

Other processing units utilizing unified file management unit UF deliver an operation code for a necessary data structure manipulation and information required for that data structure manipulation to unified file management unit UF. Unified file management unit UF executes the instructed data structure manipulation and returns the result of the execution to a processing unit that called unified file management unit UF.

In this program development apparatus, a scalar (atom) and a list structure are adopted as a data structure for use. This is because if this list structure is employed, the structure of "array", "record", "vector" and the like can be represented. If this list structure is employed, the following accesses are executed: (1) access to an element by a subscript (identifier), and (2) access to an element by matches of keys. This list structure includes a logic identifier "fid" for an identifier (name) of the entire data structure to be processed, and a logic identifier "did" for identifying an array in which a data area of the size of an array element indicated by "size" in the data structure identified by the logic identifier "fid" is set as one element. An access area in a file is determined by use of those identifiers.

If unified file management unit UF is referred to by the data structure of the scalar, reference and updating by a data name is executed.

Each processing unit operates in parallel while mutually exchanging information. Thus, a multi access requirement is generated to unified file managing unit UF. Since these accesses are dynamically generated, the processing unit utilizing unified file management unit UF fails to determine whether or not the multi access is generated. Even if the processing unit can determine that the multi access is generated, a processing unit that has required the accesses cannot be informed whether or not a processing unit that has required the accesses later may execute the accesses to the file. Thus, unified file management unit UF comprises a mechanism for insuring consistency with respect to a series of accesses as to the file in a multi process environment. As such a mechanism, a lock control mechanism is provided that sets a lock in a required range of the file in unified file management unit UF by informing unified file management unit UF as to whether or not a subsequent access requirement is made for the same record in the same file and which access requirement is made, when the processing unit utilizing unified file management unit UF makes an access requirement.

A lock control is implemented as one primitive. There are two types of files managed by unified file management unit UF, i.e., a temporary file and a permanent file. The temporary file is consumed if used once. The permanent file is reserved throughout execution of an object program and before and after such execution. When a primitive using the file is executed, a temporary file to be written is always produced. Description will now be made on a specific example of production of a software system by the program development apparatus being one embodiment of the present invention.

As to stock management problems, the case where a module for retrieval by "keys" is described will now be considered. The following problem will now be described as a specific problem.

Retrieve data is a list of articles. This article list has such a structure as "article list: article code, article name, article quantity, article delivering source". A retrieval item (key) is the article code or quantity. In the case of a retrieval in which the quantity is "key", a given quantity or larger quantity of articles corresponding to the article code are listed.

Figure 52:
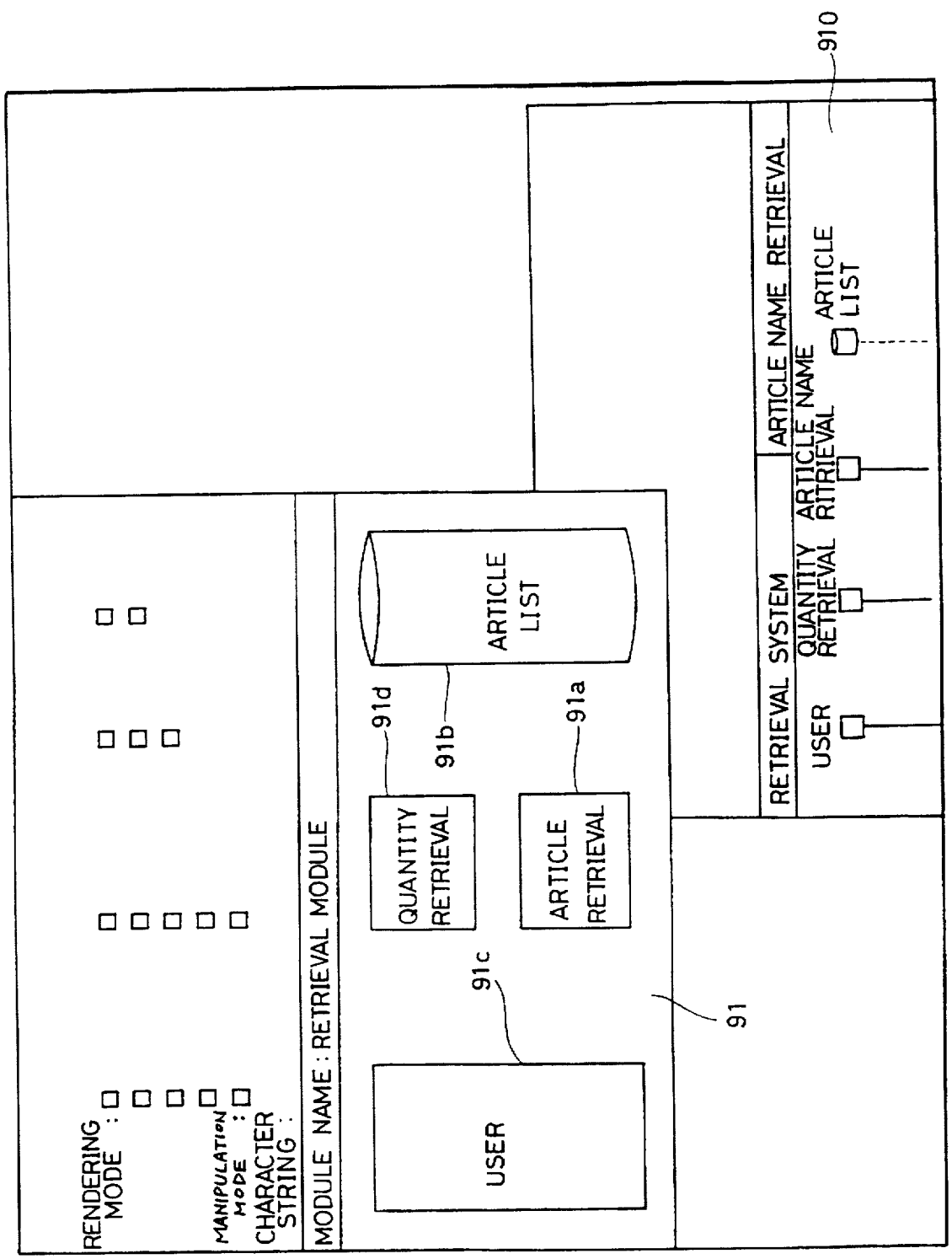
FIG. 52 illustrates an interface of a system with external environments.

An interface of a system with external environments is first described as shown in FIG. 52. This object system to be described includes an article name retrieval module 91a in which an article name code is input and a corresponding list is output, an article list file 91b, an external module (user) 91c, and an article quantity retrieval module 91d in which the quantity of articles is input and a corresponding list is output. This description from the functional aspect is represented by a functional block diagram 91. At this time, module information represented in this functional block diagram 91 is converted into a sequence chart and displayed (see the lower right portion of FIG. 52).

Figure 53:
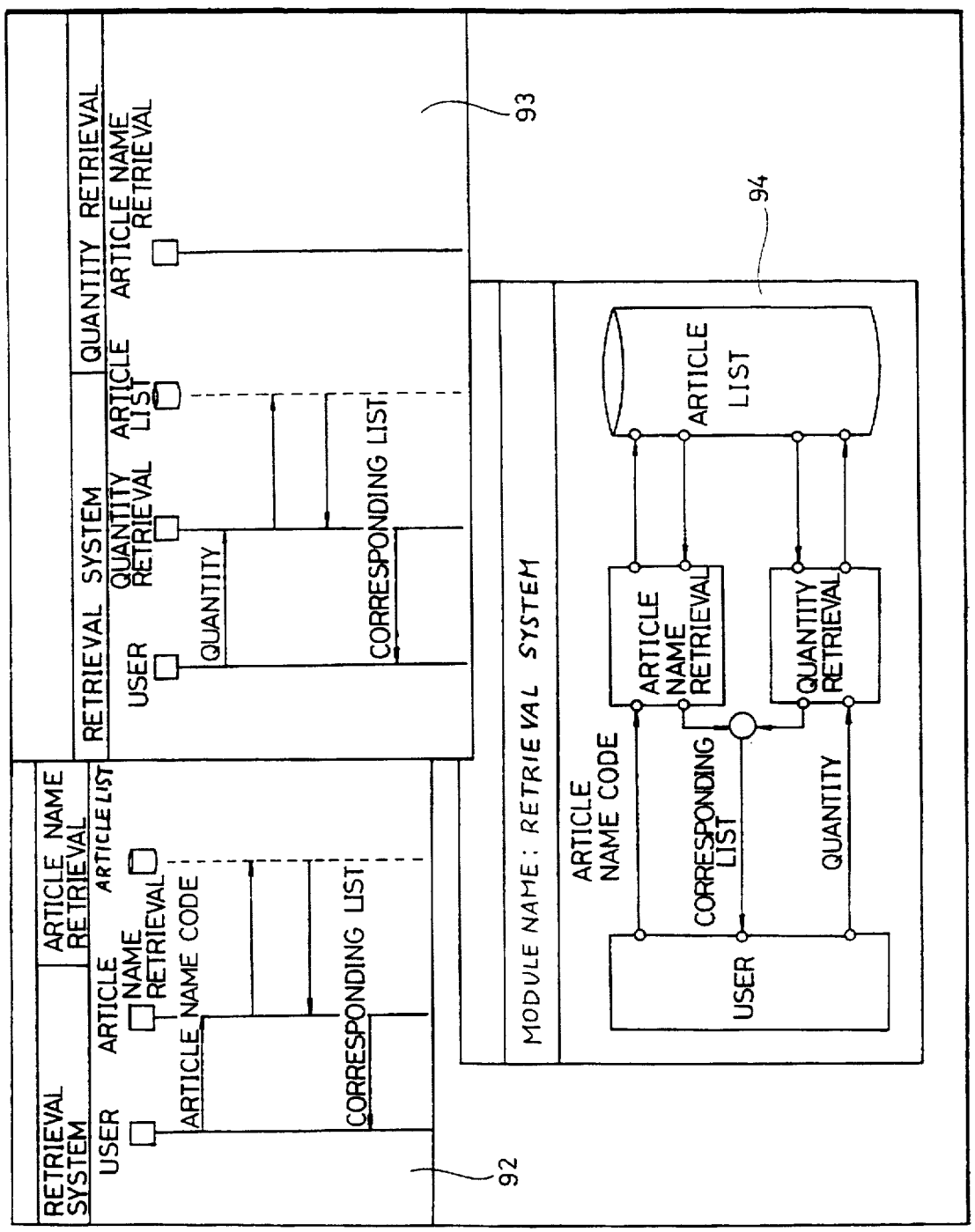
FIG. 53 illustrates a sequence relation of the data flow between each of the module.

Next, a sequence relation of the data flow between each of the modules is described as shown in FIG. 53. An article name retrieval sequence is described in a first sequence chart 92, while a quantity retrieval sequence is described in a second sequence chart 93. Signal lines described in sequence charts 92 and 93 are immediately converted into data arc on a functional block diagram 94 and displayed thereon. At that time, since port information is not reflected in the sequence charts, the port information is described in functional block diagram 94.

While the mutual relation of data is described by using the sequence charts, it may be described by using functional block diagrams. As described above, if common information are mutually converted and reflected between different representation formats, inconsistencies between descriptions can be avoided.

Figure 54:
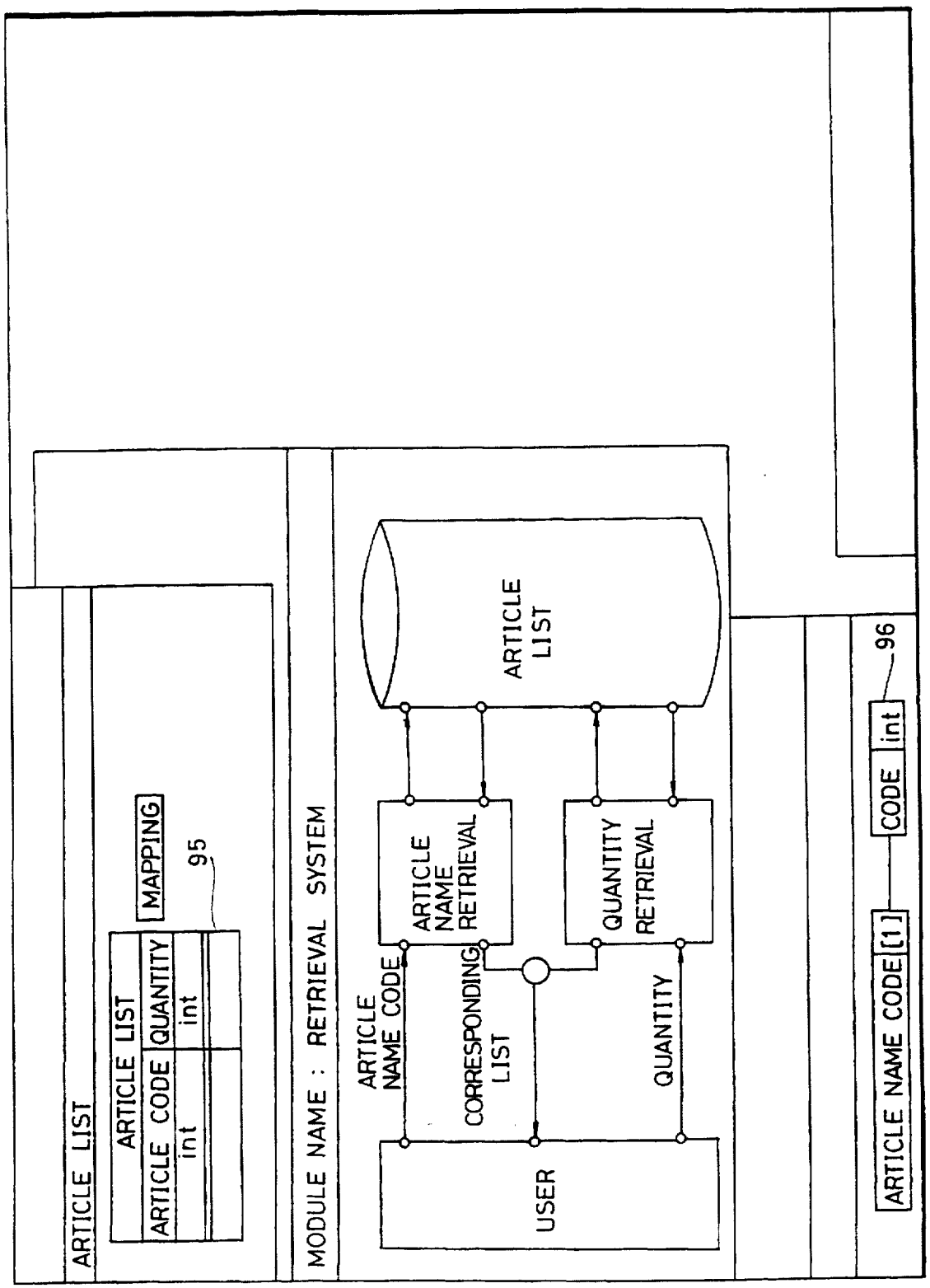
FIG. 54 illustrates a data structure.

Next, a data structure is described as shown in FIG. 54. A corresponding list (not shown) and an article list are described in a relation table 95, while an article name code and an article quantity are described in a data block diagram 96. In the example shown in FIG. 54, the corresponding list describes only the article name code and the article quantity which are inevitably necessary. The described data structure, the data arc on the functional block diagram and the signal lines on the sequence chart are mapped by a mapping manipulation. These mapping manipulation makes the user free from an annoying and complicated work of naming the articles.

Figure 55:
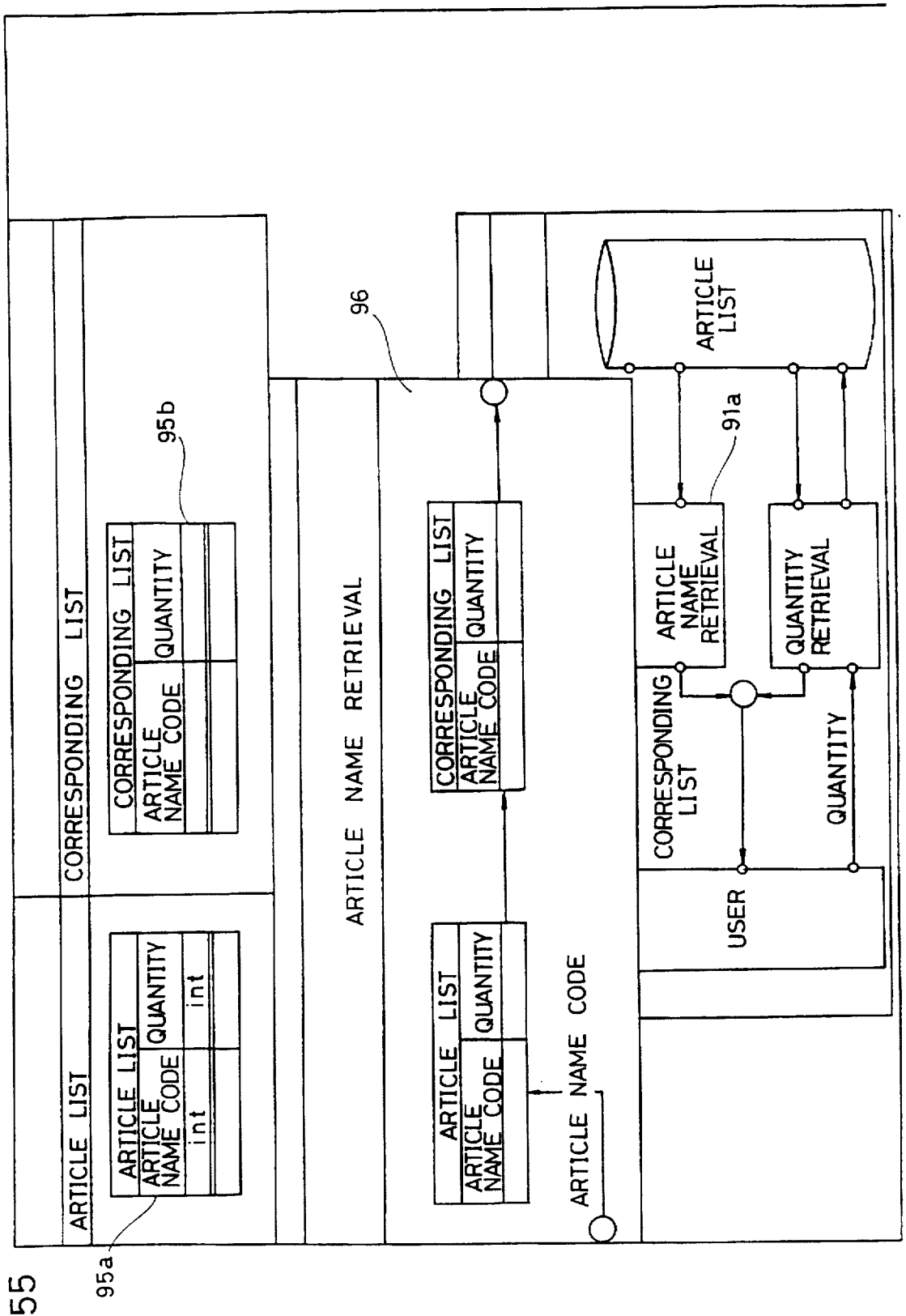
FIG. 55 illustrates a definition of the detail of an internal module.

Then, a definition of the detail of an internal module is executed as shown in FIG. 55. Referring to FIG. 55, an article name retrieval module 91a included in an object module to be described is a file manipulation and is hence described in a table handling diagram 96. In this table handling diagram 96, input/output information is converted and reflected by a functional block diagram that has already been described before. The structure of table data in table handling diagram 96 is cited from relation tables 95a and 95b. The cited data structure is mapped with an original relation table. Accordingly, if a data structure of the original relation table is altered, then a data structure in this table handling diagram 96 is also altered. This makes it possible to prevent a forgetting of alteration with the alteration of specifications.

Figure 56:
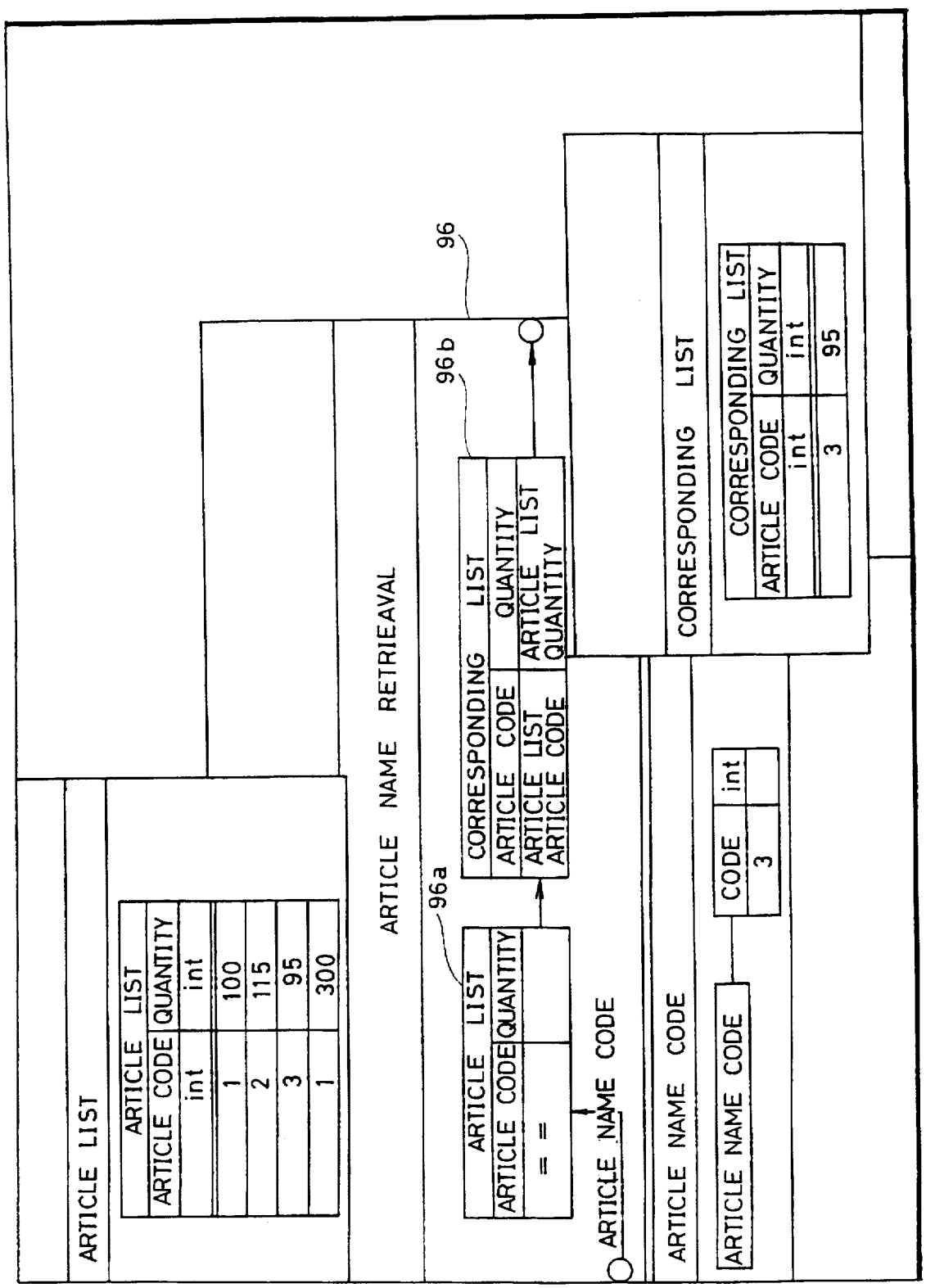
FIG. 56 illustrates a prototyping carried out for an executable article name retrieval module.

In the article name retrieval module, its specification description is completed and then becomes executable by the description in the table handling diagram shown in FIG. 55. A prototyping is carried out for this executable article name retrieval module as shown in FIG. 56, to verify the specification description contents. More specifically, an article code of an article list 96a is set as input data, while a corresponding list 96b is set as output data. An article name code included in the article list is filled in the article code of article list 96a. A subsequent executing operation of the unit causes an article corresponding to this article name code 3 to be displayed on a corresponding list along with a corresponding quantity thereof. The specification description contents is altered on the basis of the result of the execution obtained by this prototyping and in accordance with an object specification, then executed again and verified.

If the description of the specification of the retrieval system is thereafter completed, the description is a single module that is partly completed and is registered as "parts".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program development apparatus, comprising:

specification description means for producing a graphic specification description with respect to an object program on a display screen using a non-text style and graphically visual language, said specification description means including describing means for describing a specification using a plurality of non-text style and graphically visual languages different from each other to produce said graphic specification description;

conversion means for converting the specified description produced by said specification description means written in at least one of said non-text style and graphically visual languages into an executable program; and file management means for storing therein as files, a plurality of data indicating the specification description produced by said specification description means in at least one of the non-text style and graphically visual language formats and a plurality of data indicating the program converted by said conversion means, said file management means including:

a memory medium for storing therein said plurality of data together with a plurality of identifiers associated with a data structure, and manipulation apparatus configured for managing a file in accordance with a primitive file manipulation instruction so as to hide details of an operation on a data structure stored in the file, responsive to an applied instruction for manipulating the structure of the data stored in said storage means by employing said identifiers.

2. The program development apparatus according to claim 1, further comprising, parts management means including means for registering as parts information, the specification description produced by said specification description means, and means for exhibiting the registered parts information, said file management means further storing therein as files, a plurality of data indicating the parts information registered by said registration means.

3. An operating method of a program development apparatus for managing a file in accordance with a primitive file manipulation instruction so as to hide details of an operation on a data structure stored in the file, comprising the steps of:

producing a graphic specification description with respect to an object program on a display screen using different non-text style and graphically visual languages;

converting said produced graphic specification description into an executable program;

storing a plurality of data indicating said specification description in the used non-text style and graphically visual language formats and a plurality of data indicating said executable program, together with a plurality of identifiers; and manipulating a data structure in response to an instruction specifying said identifiers.

4. The operating method of the program development apparatus according to claim 3, further comprising the steps of:

registering said produced specification description as parts information;

storing a plurality of data indicating said registered parts information together with an identifier; and manipulating the structure of said stored data by employing said identifier in response to an applied instruction.

* * * * *

UNITED STATES PATENT AND TRADEMARK OFFICE
CERTIFICATE OF CORRECTION

PATENT NO. : 5,794,042
DATED : August 11, 1998
INVENTOR(S) : Hiroaki TERADA et al It is certified that error appears in the above-identified patent and that said Letters Patent is hereby corrected as shown below:

On the cover sheet, insert [73] Assignee,
--Sharp Kabushiki Kaisha, Osaka, JAPAN
Matsushita Electric Industrial Co., Ltd. Osaka, JAPAN
Sanyo Electric Co., Ltd., Osaka, JAPAN
Mitsubishi Denki Kabushiki Kaisha, Tokyo, JAPAN--.

Signed and Sealed this

Sixteenth Day of March, 1999

Attest:

Q. TODD DICKINSON

Attesting Officer     Acting Commissioner of Patents and Trademarks